United States Patent
Gupta et al.

(10) Patent No.: US 8,615,241 B2
(45) Date of Patent: Dec. 24, 2013

(54) METHODS AND APPARATUS FOR FACILITATING ROBUST FORWARD HANDOVER IN LONG TERM EVOLUTION (LTE) COMMUNICATION SYSTEMS

(75) Inventors: Ajay Gupta, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 13/028,971

(22) Filed: Feb. 16, 2011

(65) Prior Publication Data

US 2011/0250892 A1 Oct. 13, 2011

Related U.S. Application Data

(60) Provisional application No. 61/322,660, filed on Apr. 9, 2010, provisional application No. 61/322,782, filed on Apr. 9, 2010.

(51) Int. Cl.
*H04W 36/00* (2009.01)
(52) U.S. Cl.
USPC .......................................................... 455/437
(58) Field of Classification Search
USPC .......................................................... 455/437
See application file for complete search history.

(56) References Cited

U.S. PATENT DOCUMENTS

| | | |
|---|---|---|
| 4,833,701 A | 5/1989 | Comroe et al. |
| 5,117,502 A | 5/1992 | Onoda et al. |
| 5,128,938 A | 7/1992 | Borras |
| 5,200,952 A | 4/1993 | Bernstein et al. |
| 5,208,837 A | 5/1993 | Richey |
| 5,229,992 A | 7/1993 | Jurkevich et al. |
| 5,247,516 A | 9/1993 | Bernstein et al. |

(Continued)

FOREIGN PATENT DOCUMENTS

| | | |
|---|---|---|
| AU | 2002353616 | 5/2003 |
| CL | 36022006 | 6/2007 |

(Continued)

OTHER PUBLICATIONS

3GPP, "3rd Generation Partnership Project, Technical Specification Group Radio Access Network, E-UTRAN Mobility Evaluation and Enhancement,(Release 9)", 3GPP Draft, R1-090856 TP for TR for Mobility Studies, 3rd Generation Partnership Project (3GPP), Mobile Competence Centre, 650, Route Des Lucioles, F-06921 Sophia-Antipolis Cedex, France, No. Athens, Greece, Feb. 3, 2009, 16 pgs., XP050318707.

(Continued)

*Primary Examiner* — Lester Kincaid
*Assistant Examiner* — Joel Ajayi
(74) *Attorney, Agent, or Firm* — John J. Ketchum

(57) ABSTRACT

Method and apparatus for facilitating inter-cell connections, such as during a forward handover or radio link failure (RLF), are disclosed. A user terminal such as a UE may store identity information associated with a source cell, and use this information in accessing target or other cells subsequent to radio link failure so as to facilitate access to context information of the user terminal. A base station may be configured to improve handover performance by associating context information with a newly assigned terminal identity. Handover performance may be enhanced by facilitating connection processing in the event of inability to retrieve user terminal context from a source cell.

16 Claims, 18 Drawing Sheets

(56) References Cited

U.S. PATENT DOCUMENTS

| | | |
|---|---|---|
| 5,251,209 A | 10/1993 | Jurkevich et al. |
| 5,267,261 A | 11/1993 | Blakeney, II et al. |
| 5,268,933 A | 12/1993 | Averbuch |
| 5,388,102 A | 2/1995 | Griffith et al. |
| 5,490,139 A | 2/1996 | Baker et al. |
| 5,491,835 A | 2/1996 | Sasuta et al. |
| 5,509,027 A | 4/1996 | Vook et al. |
| 5,539,925 A | 7/1996 | Yli-Kotila et al. |
| 5,561,841 A | 10/1996 | Markus |
| 5,572,528 A | 11/1996 | Shuen |
| 5,574,720 A | 11/1996 | Lee |
| 5,594,943 A | 1/1997 | Balachandran |
| 5,694,548 A | 12/1997 | Baugher et al. |
| 5,722,044 A | 2/1998 | Padovani et al. |
| 5,737,044 A | 4/1998 | Norman et al. |
| 5,794,137 A | 8/1998 | Harte |
| 5,854,785 A | 12/1998 | Willey |
| 5,870,427 A | 2/1999 | Tiedemann, Jr. et al. |
| 5,974,036 A | 10/1999 | Acharya et al. |
| 5,978,366 A | 11/1999 | Massingill et al. |
| 6,016,316 A | 1/2000 | Moura et al. |
| 6,018,521 A | 1/2000 | Timbs et al. |
| 6,031,863 A | 2/2000 | Jusa et al. |
| 6,055,428 A | 4/2000 | Soliman |
| 6,073,021 A | 6/2000 | Kumar et al. |
| 6,084,969 A | 7/2000 | Wright et al. |
| 6,094,427 A | 7/2000 | Yi |
| 6,097,952 A | 8/2000 | Kawabata |
| 6,101,394 A | 8/2000 | Illidge |
| 6,137,787 A | 10/2000 | Chawla et al. |
| 6,144,671 A | 11/2000 | Perinpanathan et al. |
| 6,151,502 A | 11/2000 | Padovani et al. |
| 6,157,668 A | 12/2000 | Gilhousen et al. |
| 6,157,833 A | 12/2000 | Lawson-Jenkins et al. |
| 6,157,978 A | 12/2000 | Ng et al. |
| 6,161,008 A | 12/2000 | Lee et al. |
| 6,163,692 A | 12/2000 | Chakrabarti et al. |
| 6,195,705 B1 | 2/2001 | Leung |
| 6,201,971 B1 | 3/2001 | Purnadi et al. |
| 6,256,300 B1 | 7/2001 | Ahmed et al. |
| 6,272,129 B1 | 8/2001 | Dynarski et al. |
| 6,285,665 B1 | 9/2001 | Chuah |
| 6,300,887 B1 | 10/2001 | Le |
| 6,308,267 B1 | 10/2001 | Gremmelmaier |
| 6,345,043 B1 | 2/2002 | Hsu |
| 6,347,091 B1 | 2/2002 | Wallentin et al. |
| 6,360,100 B1 | 3/2002 | Grob et al. |
| 6,366,561 B1 | 4/2002 | Bender |
| 6,370,380 B1 | 4/2002 | Norefors et al. |
| 6,397,065 B1 | 5/2002 | Huusko et al. |
| 6,400,722 B1 | 6/2002 | Chuah et al. |
| 6,445,922 B1 | 9/2002 | Hiller et al. |
| 6,446,127 B1 | 9/2002 | Schuster et al. |
| 6,449,481 B1 | 9/2002 | Kwon et al. |
| 6,456,604 B1 | 9/2002 | Lee et al. |
| 6,466,964 B1 | 10/2002 | Leung et al. |
| 6,473,418 B1 | 10/2002 | Laroia et al. |
| 6,493,725 B1 | 12/2002 | Iwai et al. |
| 6,496,704 B2 | 12/2002 | Yuan |
| 6,510,153 B1 | 1/2003 | Inoue et al. |
| 6,516,352 B1 | 2/2003 | Booth et al. |
| 6,519,457 B1 | 2/2003 | Jiang et al. |
| 6,529,732 B1 | 3/2003 | Vainiomaki et al. |
| 6,535,493 B1 | 3/2003 | Lee et al. |
| 6,553,227 B1 | 4/2003 | Ho et al. |
| 6,587,680 B1 | 7/2003 | Ala-Laurila et al. |
| 6,611,547 B1 | 8/2003 | Rauhala |
| 6,640,248 B1 | 10/2003 | Jorgensen |
| 6,654,363 B1 | 11/2003 | Li et al. |
| 6,671,512 B2 | 12/2003 | Laakso |
| 6,701,155 B2 | 3/2004 | Sarkkinen et al. |
| 6,708,031 B2 | 3/2004 | Purnadi et al. |
| 6,714,524 B1 | 3/2004 | Kim et al. |
| 6,714,777 B1 | 3/2004 | Naqvi et al. |
| 6,714,788 B2 | 3/2004 | Voyer |
| 6,754,492 B1 | 6/2004 | Stammers et al. |
| 6,763,007 B1 | 7/2004 | La Porta et al. |
| 6,768,908 B1 | 7/2004 | Jalloul et al. |
| 6,771,962 B2 | 8/2004 | Saifullah et al. |
| 6,785,256 B2 | 8/2004 | O'neill |
| 6,807,421 B1 | 10/2004 | Ahmavaara |
| 6,842,621 B2 | 1/2005 | Labun et al. |
| 6,842,630 B2 | 1/2005 | Periyalwar |
| 6,862,446 B2 | 3/2005 | O'Neill et al. |
| 6,901,063 B2 | 5/2005 | Vayanos et al. |
| 6,917,605 B2 | 7/2005 | Kakemizu et al. |
| 6,937,566 B1 | 8/2005 | Forslow |
| 6,947,401 B2 | 9/2005 | El-Malki et al. |
| 6,950,650 B2 | 9/2005 | Roeder |
| 6,954,442 B2 | 10/2005 | Tsirtsis et al. |
| 6,961,579 B2 | 11/2005 | Inukai et al. |
| 6,965,585 B2 | 11/2005 | Grilli et al. |
| 6,970,445 B2 | 11/2005 | Oneill et al. |
| 6,990,337 B2 | 1/2006 | Oneill et al. |
| 6,990,339 B2 | 1/2006 | Turanyi et al. |
| 6,990,343 B2 | 1/2006 | Lefkowitz |
| 6,992,994 B2 | 1/2006 | Das et al. |
| 6,993,332 B2 | 1/2006 | Pedersen et al. |
| 7,003,311 B2 | 2/2006 | Ebata et al. |
| 7,006,826 B2 | 2/2006 | Cao et al. |
| 7,016,317 B1 | 3/2006 | Pathak et al. |
| 7,047,009 B2 | 5/2006 | Laroia et al. |
| 7,068,640 B2 | 6/2006 | Kakemizu et al. |
| 7,068,654 B1 | 6/2006 | Joseph et al. |
| 7,069,040 B2 | 6/2006 | Iwanaga et al. |
| 7,089,008 B1 | 8/2006 | Back et al. |
| 7,116,654 B2 | 10/2006 | Kim |
| 7,123,599 B2 | 10/2006 | Yano et al. |
| 7,130,291 B1 | 10/2006 | Kim et al. |
| 7,161,913 B2 | 1/2007 | Jung |
| 7,177,641 B1 | 2/2007 | Miernik et al. |
| 7,197,318 B2 | 3/2007 | Schwarz et al. |
| 7,233,583 B2 | 6/2007 | Asthana et al. |
| 7,233,794 B2 | 6/2007 | Grob et al. |
| 7,263,357 B2 | 8/2007 | Lee et al. |
| 7,266,100 B2 | 9/2007 | Le et al. |
| 7,272,122 B2 | 9/2007 | Trossen et al. |
| 7,283,495 B2 | 10/2007 | Lee et al. |
| 7,283,511 B2 | 10/2007 | Hans et al. |
| 7,290,063 B2 | 10/2007 | Kalliokulju et al. |
| 7,336,953 B2 | 2/2008 | Kim et al. |
| 7,369,855 B2 | 5/2008 | Oneill et al. |
| 7,369,859 B2 | 5/2008 | Gallagher |
| 7,376,101 B2 | 5/2008 | Shim et al. |
| 7,389,110 B2 | 6/2008 | Lee |
| 7,391,741 B2 | 6/2008 | Kang |
| 7,403,789 B2 | 7/2008 | Takano et al. |
| 7,408,917 B1 | 8/2008 | Kyung et al. |
| 7,408,950 B2 | 8/2008 | Okuyama |
| 7,409,428 B1 | 8/2008 | Brabec et al. |
| 7,418,264 B2 | 8/2008 | Kim |
| 7,420,957 B2 | 9/2008 | Kim et al. |
| 7,460,504 B2 | 12/2008 | Tsirtsis et al. |
| 7,492,762 B2 | 2/2009 | Chowdhury |
| 7,499,401 B2 | 3/2009 | Buddhikot et al. |
| 7,505,765 B2 | 3/2009 | Frangione et al. |
| 7,515,561 B2 | 4/2009 | Koodli et al. |
| 7,529,239 B2 | 5/2009 | Seppanen |
| 7,567,639 B2 | 7/2009 | Huh et al. |
| 7,583,592 B2 | 9/2009 | Park et al. |
| 7,593,364 B2 | 9/2009 | Asthana |
| 7,623,493 B2 | 11/2009 | Baba et al. |
| 7,653,415 B2 | 1/2010 | Van Rooyen |
| 7,668,541 B2 | 2/2010 | Oneill et al. |
| 7,672,254 B2 | 3/2010 | Kim et al. |
| 7,702,309 B2 | 4/2010 | Faccin et al. |
| 7,706,739 B2 | 4/2010 | Kjellberg |
| 7,729,350 B2 | 6/2010 | Singh et al. |
| 7,742,781 B2 | 6/2010 | Chen et al. |
| 7,773,947 B2 | 8/2010 | Gerlach |
| 7,962,142 B2 | 6/2011 | Oneill et al. |
| 8,112,102 B2 | 2/2012 | Fischer |
| 8,144,664 B2 | 3/2012 | Pani et al. |
| 8,165,587 B2 | 4/2012 | Dahlen et al. |

(56) References Cited

U.S. PATENT DOCUMENTS

| | | |
|---|---|---|
| 8,184,615 B2 | 5/2012 | Tsirtsis et al. |
| 8,229,120 B2 | 7/2012 | Iwamura et al. |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1 | 6/2002 | Bautz et al. |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0126701 A1 | 9/2002 | Requena |
| 2002/0136226 A1 | 9/2002 | Christoffel et al. |
| 2002/0161927 A1 | 10/2002 | Inoue et al. |
| 2002/0168982 A1 | 11/2002 | Sorokine et al. |
| 2002/0199012 A1 | 12/2002 | Cable et al. |
| 2003/0009580 A1 | 1/2003 | Chen et al. |
| 2003/0018774 A1 | 1/2003 | Flinck et al. |
| 2003/0026220 A1 | 2/2003 | Uhlik et al. |
| 2003/0027572 A1 | 2/2003 | Karlsson et al. |
| 2003/0032430 A1 | 2/2003 | Lee |
| 2003/0036392 A1 | 2/2003 | Yukie |
| 2003/0078047 A1 | 4/2003 | Lee et al. |
| 2003/0092444 A1 | 5/2003 | Sengodan et al. |
| 2003/0103496 A1 | 6/2003 | Lakshmi Narayanan et al. |
| 2003/0104814 A1 | 6/2003 | Gwon et al. |
| 2003/0112766 A1 | 6/2003 | Riedel et al. |
| 2003/0204599 A1 | 10/2003 | Trossen et al. |
| 2003/0212764 A1 | 11/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2004/0002362 A1 | 1/2004 | Chuah et al. |
| 2004/0004736 A1 | 1/2004 | Ogura et al. |
| 2004/0004967 A1 | 1/2004 | Nakatsugawa et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1 | 6/2004 | Forssell |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063338 A1 | 3/2005 | Tsui |
| 2005/0063389 A1 | 3/2005 | Elliott et al. |
| 2005/0079823 A1 | 4/2005 | Kurek et al. |
| 2005/0089043 A1 | 4/2005 | Seckin et al. |
| 2005/0128949 A1 | 6/2005 | Ku et al. |
| 2005/0141468 A1 | 6/2005 | Kim et al. |
| 2005/0201324 A1 | 9/2005 | Zheng |
| 2005/0268153 A1 | 12/2005 | Armstrong et al. |
| 2006/0002344 A1 | 1/2006 | Ono et al. |
| 2006/0003768 A1 | 1/2006 | Chiou |
| 2006/0007936 A1 | 1/2006 | Shrum, Jr. et al. |
| 2006/0029028 A1 | 2/2006 | Kim et al. |
| 2006/0056348 A1 | 3/2006 | Marinier et al. |
| 2006/0069809 A1 | 3/2006 | Serlet |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0217119 A1 | 9/2006 | Bosch et al. |
| 2006/0230019 A1 | 10/2006 | Hill et al. |
| 2006/0285520 A1 | 12/2006 | Venkitaraman |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0076653 A1 | 4/2007 | Park et al. |
| 2007/0076658 A1 | 4/2007 | Park et al. |
| 2007/0078999 A1 | 4/2007 | Corson et al. |
| 2007/0083669 A1 | 4/2007 | Tsirtsis et al. |
| 2007/0086389 A1 | 4/2007 | Park et al. |
| 2007/0091810 A1 | 4/2007 | Kim et al. |
| 2007/0099618 A1 | 5/2007 | Kim |
| 2007/0105555 A1 | 5/2007 | Miernik et al. |
| 2007/0105584 A1 | 5/2007 | Grob et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0171875 A1 | 7/2007 | Suda |
| 2007/0189282 A1 | 8/2007 | Lohr et al. |
| 2007/0191054 A1 | 8/2007 | Das et al. |
| 2007/0191065 A1 | 8/2007 | Lee et al. |
| 2007/0195788 A1 | 8/2007 | Vasamsetti et al. |
| 2008/0031198 A1 | 2/2008 | Hwang et al. |
| 2008/0051091 A1 | 2/2008 | Phan et al. |
| 2008/0074994 A1 | 3/2008 | Jen |
| 2008/0076424 A1 | 3/2008 | Barber et al. |
| 2008/0089287 A1 | 4/2008 | Sagfors et al. |
| 2008/0146231 A1 | 6/2008 | Huang et al. |
| 2008/0160999 A1 | 7/2008 | Eklund |
| 2008/0240039 A1 | 10/2008 | Parekh et al. |
| 2008/0253332 A1 | 10/2008 | Ore et al. |
| 2008/0259855 A1 | 10/2008 | Yoon et al. |
| 2008/0261600 A1* | 10/2008 | Somasundaram et al. .... 455/436 |
| 2009/0029706 A1 | 1/2009 | Prakash et al. |
| 2009/0046573 A1 | 2/2009 | Damnjanovic |
| 2009/0175448 A1 | 7/2009 | Watanabe et al. |
| 2009/0181673 A1 | 7/2009 | Barrett |
| 2009/0190556 A1 | 7/2009 | Venkitaraman |
| 2009/0191878 A1 | 7/2009 | Hedqvist et al. |
| 2009/0274086 A1 | 11/2009 | Petrovic et al. |
| 2009/0285218 A1 | 11/2009 | Adamczyk et al. |
| 2011/0019614 A1 | 1/2011 | Oneill et al. |
| 2011/0039546 A1 | 2/2011 | Narasimha et al. |
| 2011/0039552 A1 | 2/2011 | Narasimha et al. |
| 2011/0103347 A1 | 5/2011 | Dimou |
| 2011/0268085 A1 | 11/2011 | Barany et al. |
| 2012/0087312 A1 | 4/2012 | Laroia et al. |
| 2012/0327908 A1 | 12/2012 | Gupta et al. |
| 2013/0208709 A1 | 8/2013 | Corson et al. |

FOREIGN PATENT DOCUMENTS

| | | |
|---|---|---|
| CL | 36052006 | 6/2007 |
| CL | 36042006 | 7/2007 |
| CL | 36032006 | 5/2010 |
| CN | 1043052 A | 6/1990 |
| CN | 1133669 A | 10/1996 |
| CN | 1344477 A | 4/2002 |
| CN | 1345518 A | 4/2002 |
| CN | 1416284 A | 5/2003 |
| CN | 1481119 A | 3/2004 |
| CN | 1514607 | 7/2004 |
| CN | 1650178 | 8/2005 |
| CN | 1859529 A | 11/2006 |
| EP | 0740440 A2 | 10/1996 |
| EP | 0813346 A1 | 12/1997 |
| EP | 0974895 A2 | 1/2000 |
| EP | 1088463 A1 | 4/2001 |

(56) References Cited

FOREIGN PATENT DOCUMENTS

| | | |
|---|---|---|
| EP | 1128704 A1 | 8/2001 |
| EP | 1345370 A2 | 9/2003 |
| EP | 1458209 A2 | 9/2004 |
| EP | 1473872 A2 | 11/2004 |
| EP | 1489808 A2 | 12/2004 |
| EP | 1507421 A1 | 2/2005 |
| EP | 1565024 A2 | 8/2005 |
| EP | 1720267 A1 | 11/2006 |
| EP | 1764942 A2 | 3/2007 |
| GB | 2322046 | 8/1998 |
| GB | 2395629 A | 5/2004 |
| JP | 2084807 | 3/1990 |
| JP | 08116329 | 5/1996 |
| JP | 11308273 | 11/1999 |
| JP | 2000125343 A | 4/2000 |
| JP | 2001217830 A | 8/2001 |
| JP | 2001237878 A | 8/2001 |
| JP | 2001245355 A | 9/2001 |
| JP | 2002111732 A | 4/2002 |
| JP | 2002513527 A | 5/2002 |
| JP | 2002165249 A | 6/2002 |
| JP | 2002281069 A | 9/2002 |
| JP | 2002281539 A | 9/2002 |
| JP | 2002534923 T | 10/2002 |
| JP | 2002537739 | 11/2002 |
| JP | 2003060685 A | 2/2003 |
| JP | 2003111134 A | 4/2003 |
| JP | 2003348007 | 5/2003 |
| JP | 2003304571 A | 10/2003 |
| JP | 2003338833 A | 11/2003 |
| JP | 2004007578 A | 1/2004 |
| JP | 2004104544 A | 4/2004 |
| JP | 2004147228 | 5/2004 |
| JP | 2004201289 A | 7/2004 |
| JP | 2004328637 A | 11/2004 |
| JP | 2005531173 T | 10/2005 |
| JP | 2007513569 | 5/2007 |
| JP | 2007521759 | 8/2007 |
| JP | 2007527177 T | 9/2007 |
| JP | 2008053889 A | 3/2008 |
| JP | 4827994 B1 | 11/2011 |
| KR | 20040004918 A | 1/2004 |
| KR | 2004105069 A | 12/2004 |
| KR | 20050023194 A | 3/2005 |
| KR | 2005066287 A | 6/2005 |
| KR | 20050065123 | 6/2005 |
| KR | 20070031810 A | 3/2007 |
| RU | 2117396 C1 | 8/1998 |
| RU | 2003120063 A | 2/2005 |
| RU | 2256299 C2 | 7/2005 |
| RU | 2005115564 A | 11/2005 |
| RU | 2267864 | 1/2006 |
| RU | 2005129079 A | 2/2006 |
| RU | 2292669 | 1/2007 |
| RU | 2294596 C2 | 2/2007 |
| TW | 200527930 | 8/2005 |
| TW | 200708018 | 2/2007 |
| WO | 9501706 A1 | 1/1995 |
| WO | WO9512297 | 5/1995 |
| WO | 9804094 A1 | 1/1998 |
| WO | WO9833288 | 7/1998 |
| WO | WO9847302 | 10/1998 |
| WO | WO9856140 A2 | 12/1998 |
| WO | WO9905828 A1 | 2/1999 |
| WO | WO9927718 | 6/1999 |
| WO | WO9966748 A1 | 12/1999 |
| WO | WO0018173 | 3/2000 |
| WO | WO0041401 | 7/2000 |
| WO | WO0041426 A1 | 7/2000 |
| WO | WO0128160 A2 | 4/2001 |
| WO | WO0158196 A1 | 8/2001 |
| WO | WO01063947 | 8/2001 |
| WO | WO0178440 | 10/2001 |
| WO | 0219746 A1 | 3/2002 |
| WO | WO0243409 A2 | 5/2002 |
| WO | 0247407 A2 | 6/2002 |
| WO | WO02056551 A1 | 7/2002 |
| WO | WO03007484 A2 | 1/2003 |
| WO | WO030017582 | 2/2003 |
| WO | WO03092316 A1 | 11/2003 |
| WO | WO03098816 A2 | 11/2003 |
| WO | WO03105516 A1 | 12/2003 |
| WO | WO2004068739 A1 | 8/2004 |
| WO | WO2004070989 | 8/2004 |
| WO | 2004075468 A2 | 9/2004 |
| WO | WO2004079949 A1 | 9/2004 |
| WO | WO2004105272 A1 | 12/2004 |
| WO | WO2004107638 A2 | 12/2004 |
| WO | WO2005029790 | 3/2005 |
| WO | 2005048629 A1 | 5/2005 |
| WO | WO2005062633 | 7/2005 |
| WO | WO2005084146 A2 | 9/2005 |
| WO | WO2005120183 A2 | 12/2005 |
| WO | WO2006002676 A1 | 1/2006 |
| WO | 2006083131 A1 | 8/2006 |
| WO | WO2008113373 A1 | 9/2008 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP Standard; 3GPP TS 36.300, 3RD Generation Partnership Project (3GPP), Mobile Competence Centre; 650, Route Des Lucioles; F-06921 Sophia-Antipolis Cedex; France, No. V9.2.0, Jan. 7, 2010, pp. 1-178, XP050401821, [retrieved on Jan. 7, 2010].

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles; F-06921 Sophia-Antipolis Cedex; France, No. V8.2.0, May 1, 2008, pp. 1-151, XP050377645.

3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre; 650, Route Des Lucioles; F-06921 Sophia-Antipolis Cedex; France, No. V9.1.0, Jan. 7, 2010, pp. 1-221, XP050401822, [retrieved on Jan. 7, 2010].

Baker, F., IETF, "RSVP Management Information Base Using SMIv2," Network Working Group, Request for Comments: 2206, pp. 1-64 (Sep. 1997).

Berger, L., et al., "RSVP Extensions for IPSEC Data Flows," IETF, Network Working Group, Request for Comments: 2207, pp. 1-14 (Sep. 1997).

Berger, L., "RSVP Refresh Overhead Reduction Extensions," IETF Network Working Group, Request for Comments: 2961, pp. 1-34 (Apr. 2001).

Bos et al., "A Framework for End-to-End Perceived Quality of Service Negotiation", IETF Internal Draft, draft-bos-mmusic-sdpqos-framework-00.txt, Nov. 2001, pp. 1-22.

Braden, R., "Resource ReSerVation Protocol (RSVP)—Ver. 1, Message Processing Rules," IETF, Network Working Group, Request for Comments: 2209, pp. 1-25 (Sep. 1997).

Braden, R., "Resource ReSerVation Protocol (RSVP)—Ver. 1 Functional Specification". IETF, Network Working Group, Request for Comments: 2205, pp. 1-112 (Sep. 1997).

Camarillo, G., et al., "Integration of Resource Management and SIP," IETF Internet Draft, draft-ietf-sip-manyfolks-resource-04.ps, Feb. 25, 2002, pp. 1-18.

Campbell, Andrew T. et al., "IP Micro-Mobility Protocols", Mobile Computing and Communications Review (MC2R), vol. 4, No. 4, pp. 45-53, (Oct. 2001).

Droms, R.: "Dynamic Host Configuration Protocol," IETF Standard, RFC 2131, Internet Engineering Task Force, IETF, CH, pp. 1-45, (Mar. 1997) XP015007915.

(56) References Cited

OTHER PUBLICATIONS

Etri, "Source Specific Multicast (SSM) Explicit Multicast (Xcast)" pp. 1-27 (Jun. 28, 2001).
Ho, Michael. "Integration AAA with Mobile IPv4", Internet Draft, pp. 1-59, Apr. 2002.
Huawei, et al.,"Clarification of definitions of HO failure cases", RAN3, 3GPP Draft; 36300_CR0202_(REL_9)_R2-101906_R3-100635, 3rd Generation Partnership Project (3GPP), Mobile Competence Centre; 650, Route Des Lucioles; F-06921 Sophia-Antipolis Cedex; France, vol. RAN WG2, No. San Francisco, USA; 20100222, Mar. 4, 2010, XP050422194, 3 pgs. [retrieved on Mar. 4, 2010].
Ian F.A., et al., "Mobility Management in Next-Generation Wireless Systems", Proceedings of the IEEE, IEEE. New York, US, vol. 87, No. 8, Aug. 1, 1999, XP011044241, ISSN: 0018-9219, pp. 1347-1384.
International Search Report and Written Opinion—PCT/US2011/031841—ISA/EPO—Nov. 22, 2011.
Johnson, D., et al., IETF Mobile IP Working Group, "Mobility Support in IPv6," ; Feb. 26, 2003 Downloaded From http://www.join.uni-muenster.de on Dec. 29, 2004, p. 1-169.
Karagiannis, Georgios. "Mobile IP: State of the Art Report," Ericsson, No. 3/0362-FCP NB 102 88 UEN, pp. 1-63, (Jul. 13, 1999).
Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph—p. 3, left-hand column, paragraph 3 p. 5, right-hand column, last paragraph—p. 7, right-hand column, last paragraph.
Leon-Garcia, Alberto; "Communication Networks: Fundamental Concepts and Key Architectures" McGraw-Hill; 2nd Edition; Copyright 2004, pp. 44-52, 429-431.
Li, Yalun et al. "Protocol Architecture for Universal Personal Computing," IEEE Journal on Selected Areas in Communications, IEEE Inc. New York, US, vol. 15, No. 8, 1 Oct. 1997, pp. 1467-1476, XP000721278 ISSN: 0733-8716.
Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Moy, J., "OSPF Version 2", Network Working Group, Request for Comments: 2328, pp. 1-244 (Apr. 1998).
"Network Layer Protocol," Jul. 13, 2002, chap. 6, pp. 1-35, URL: http://www2.yamanashi-ken.acdp/~itoyo/lecture/network/network06/index06.htm.
Nortel: "Forward Hand-Off options", R2-071980, 3GPP TSG-RAN WG2 Meeting #58, Kobe, Japan, May 7-11, 2007, sections 2-3.
Panasonic, "Necessity of forward handover", 3GPP Draft, R2-062146, 3rd Generation Partnership Project (3GPP), Mobile Competence Centre, 650, Route Des Lucioles, F-06921 Sophia-Antipolis Cedex, France, vol. RAN WG2, No. Tallinn, 20060823, Aug. 23, 2006, XP050131764.
Papalilo, D. et al. "Extending SIP for QoS Support", www.coritel.it/publications/IP_download/papalilo-salsano-veltri.pdf, Dec. 8, 2001, pp. 1-6.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Pollini, G Petal., "Trends in Handover Design" IEEE 34(3), pp. 82-90, Mar. 1, 1996, XP00557380.
Rosenberg J et al: RFAC 3261: "SIP: Session Initiation Protocol" 20020601; 20020600, Jun. 1, 2002, pp. 1-269, XP015009039.
Schulzrinne et al., "Application-Layer Mobility Using SIP", 0-7803-7133 IEEE, pp. 29-36, Jan. 2000.
Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129-134.
"Terms for Use in Textbooks and Lectures on Distributed Computing," Feb. 13, 2005, URL: http://web.archive.org/web/20050213090736/http://www.nuis.ac.jp/~nagai/lecture/dce.html.
Thulasi, A., et al., "IPv6 Prefix Delegation Using ICMPv6", Network Working Group, Hewlett-Packard, pp. 1-34, Apr. 2004.
TIA/EIA/IS-707A.8 "Data Service Options for Spread Spectrum Systems: Radio Link Protocol Type 2" pp. 1-1:4:12 (Mar. 1999).
Trossen, D. et al., "A Dynamic Protocol for Candidate Access-Router Discovery", 35 pgs., Mar. 14, 2003.
Valko, A.G. et al.: "Cellular IP: A New Approach to Internet Host Mobility" Computer Communication Review, Association for Computing Machinery. New York, USvol.29, No. 1, Jan. 1999, pp. 50-65, XP000823873 ISSN: 0146-4833, p. 56, Line 7-Line13.
Wedlund et al: "Mobility Support Using SIP", Proc. Of ACM/IEEE International Conference on Wireless and Mobile Multimedia (WoWMoM '99), Seattle, Washington, Aug. 1999.
Wroclawski, J., "The Use of RSVP with IETF Integrated Services," IETF, Network Working Group, Request for Comments: 2210, ppp. 1-33 (Sep. 1997).
Zhou, S., et al., "A Location Management Scheme for Mobility Support in Wireless IP Networks Using Session Initiation Protocol (SIP)", 1531-2216/01 IEEE, pp. 486-491, Oct. 2001.
Zte, et al., "Handover Cause Report for Mobility Robustness Optimization", 3GPP Draft; R3-092982, 3rd Generation Partnership Project (3GPP), Mobile Competence Centre; 650, Route Des Lucioles; F-06921 Soph Iaantipolis Cedex; France, No. Jeju; Nov. 9, 2009, XP050392455, 4 pgs. [retrieved on Nov. 19, 2009].
3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)," version 0.0.1, Release 8, year 2007, pp. 9.
Basic Knowledge of Communications Term of Switching HUB, URL: http://www.wdic.org/w/WDIC/%E3%82%B9%E3%82%-A4%E3%83%83%E3%83%81%E3%83%B3%E3%82%B0HUB, Nov. 9, 2006.
International Preliminary Report on Patentability—PCT/US2011/031841, The International Bureau of WIPO—Geneva, Switzerland—Oct. 9, 2012.
Taiwan Search Report—TW095134675—TIPO—Oct. 3, 2012 (060634TW).
Mockapetris P., "Domain Names—Implentation and Specification", IETF RFC 1035, Nov. 1987.

* cited by examiner

METHODS AND APPARATUS FOR FACILITATING ROBUST FORWARD HANDOVER IN LONG TERM EVOLUTION (LTE) COMMUNICATION SYSTEMS

CROSS-REFERENCE TO RELATED APPLICATIONS

This application claims priority under 35 U.S.C. §119(e) to U.S. Provisional Patent Application Ser. No. 61/322,660, entitled METHOD AND APPARATUS THAT FACILITATES A ROBUST FORWARD HANDOVER FOR LONG TERM EVOLUTION USER EQUIPMENT, filed on Apr. 9, 2010, and U.S. Provisional Patent Application Ser. No. 61/322,782, entitled METHOD AND APPARATUS THAT FACILITATES A ROBUST FORWARD HANDOVER FOR LONG TERM EVOLUTION USER EQUIPMENT USING USER EQUIPMENT IDENTITIES, filed on Apr. 9, 2010. The content of each of these applications is hereby incorporated by reference herein in its entirety for all purposes.

FIELD

This application is directed generally to wireless communications systems. More particularly, but not exclusively, the application relates to methods and apparatus for facilitating robust forward handovers in wireless communications systems such as LTE communication systems.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), Node Bs, Enhanced Node Bs (EnodeBs), or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-input-single-output (SISO), single-input-multiple output (SIMO), multiple-input-single-output (MISO), or multiple-input-multiple-output (MIMO) system.

User terminal devices, such as UEs, are often handed off between base stations and associated cells, for example, when a UE is moving relative to the base stations, or based on other considerations such as base station type, interference, loading or other criteria. In order to provide continuous service, handover procedures are used to effect transfers of UEs between base stations.

SUMMARY

This disclosure relates generally to wireless communications systems. More particularly, but not exclusively, this disclosure relates to systems, methods, and apparatus for facilitating inter-cell connections, such as during a forward handover or radio link failure.

For example, in one aspect, the disclosure relates to a method for facilitating a forward handover in a communications system. The method may include, for example, receiving, at a user terminal from a first base station of a first cell, first identity information associated with the first cell. The method may further include initiating establishment of a connection, such as through a forward handover from the first cell to a second cell, between the user terminal and a second base station of the second cell and receiving second identity information associated with the second cell. The method may further include establishing a Radio Resource Control (RRC) connected state (RRC_Connected) with the second base station and declaring a Radio Link Failure (RLF) associated with the second base station between establishment of the RRC connection state and completion of establishment of the connection to the second base station. The method may further include initiating a connection with a third base station of a third cell using the first identity information.

The first identity information may include, for example, a Physical Cell Identity (PCI) and a Cell Radio Network Temporary Identifier (C-RNTI) associated with the first base station. The first identity information may include an SAE Temporary Mobile Subscriber Identity (S-TMSI)/random number. The initiation of establishment of a connection between the user terminal and the second cell may be done in response to an RLF associated with a connection with the first base station. The initiation of establishment of a connection between the user terminal and the second base station may be done as part of a forward handover procedure between the first cell and the second cell. Determination and declaration of an RLF may occur before completion of an RRCConnectionReconfiguration procedure.

The third base station may be a different base station from the first base station and the second base station. The third base station and the first base station may be the same base station.

The method may further include, for example, establishing an RRC_Connected state with the third base station, and receiving second identity information associated with the third cell. The method may further include declaring a second RLF associated with the third base station between establishment of the RRC_Connected state with the third base station and completion of establishment of the connection to the third base station. The method may further include initiating a connection with a fourth base station of a fourth cell using the first identity information. The method may further include initiating subsequent connections with the same or different cells in the event of multiple RLF. The method may further include, for example, disregarding the second identity information during the establishing an RRC_Connected state with the third (or subsequent) base stations.

In another aspect, the disclosure relates to a method for facilitating a forward handover in a communications system. The method may include, for example, receiving, at a target base station, first identity information from a user terminal including information for retrieval of user context information stored at a source base station, and sending second identity information to the user terminal. The method may further include receiving, subsequent to declaration of an RLF at the user terminal, the second identity information from the user terminal, and sending third identity information to the user terminal. The method may further include associating the user context information with the third identity information. The method may further include retrieving the user context information from the source base station.

The first identity information may include, for example, a Physical Cell Identity (PCI) and a Cell Radio Network Temporary Identifier (C-RNTI) associated with the first base station. The first identity information may include an SAE Temporary Mobile Subscriber Identity (S-TMSI) or C-RNTI and random number (e.g., a number generated by the UE in the event that the UE is not yet allocated an S-TMSI by the MME associated with the base station/eNB). The second identity information may include a first C-RNTI generated by the second base station. The third identity information may include a second C-RNTI generated by the second base station.

In another aspect, the disclosure relates to a method for facilitating a forward handover in a communications system. The method may include, for example, receiving, at a target base station, first identity information from a user terminal including information for retrieval of user context information stored at a source base station and initiating retrieval of the user context from the source base station. The context information retrieval may fail. The method may further include sending, in response to failure to retrieve the user context information, a context retrieval fail message to the user terminal.

The method may further include, for example, receiving, from the user terminal, a connection request message. The method may further include sending a connection setup message to the user terminal subsequent to receipt of the connection request message. The connection setup message may be an RRCConnectionSetup message.

The connection request message may be, for example, an RRCConnectionRequest message, and the connection request message received without receipt of preceding Random Access Channel (RACH) procedure signaling from the user terminal.

In another aspect, the disclosure relates to a method for facilitating a forward handover in a communications system. The method may include, for example, sending, from a user terminal to a target base station, first identity information including information for retrieval of user context information stored at a source base station and receiving, from the target base station, a context retrieval fail message. The method may further include sending a connection request message to the target base station, without performing a RACH procedure with the target base station, subsequent to receipt of the context retrieval fail message.

The connection request message may be, for example, an RRCConnectionRequest message. The method may further include receiving, from the target base station, a connection setup message. The method may further include sending a setup complete message. The setup complete message may be an RRCConnectionSetupComplete message.

In another aspect, the disclosure relates to computer program products including computer readable media having instructions for causing a computer to perform the above-described methods.

In another aspect, the disclosure relates to communication apparatus and devices configured to perform the above-described methods.

In another aspect, the disclosure relates to communication devices and apparatus including means for performing the above-described methods.

Additional aspects, features, and functionality are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
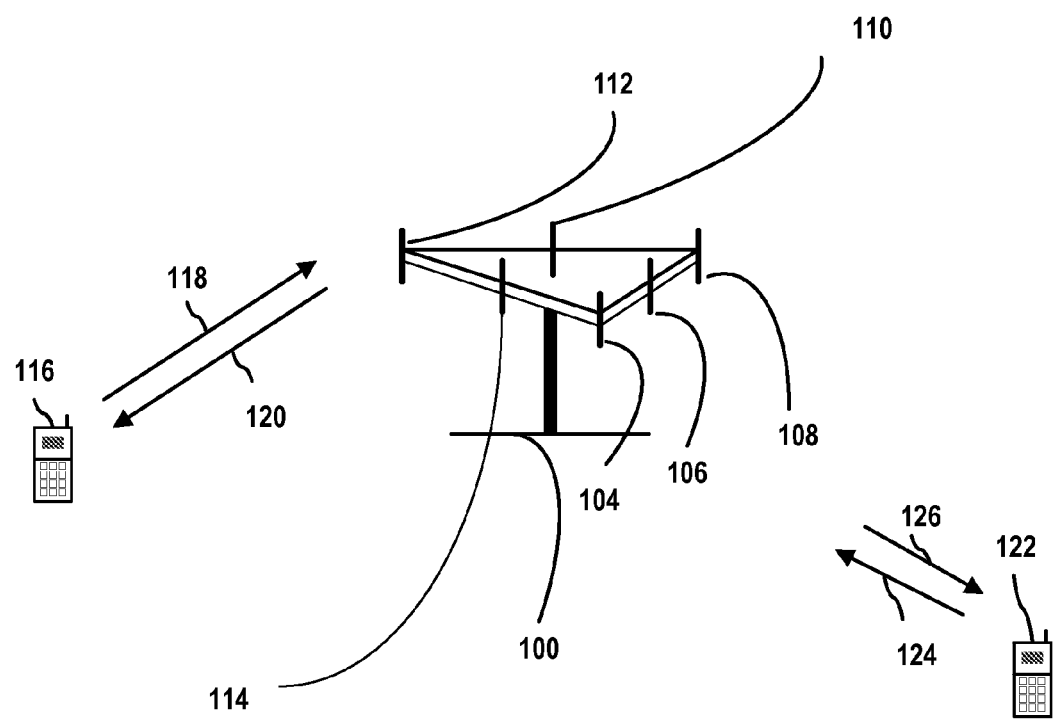
FIG. 1 illustrates details of a wireless communications system.

This disclosure relates generally to wireless communication systems and systems and method for facilitating inter-cell connections, such as during a forward handover or radio link failure.

In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (W-CDMA), Time Division Synchronous CDMA (TD-SCDMA), as well as UTRA/UMTS-TDD 1.28 Mcps Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels may include the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
GERAN GSM Radio Access Network
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast over a single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The spatial dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas, however, LTE systems do not in general provide for coordination of sending of reference signals from multiple base stations or eNBs.

The 3GPP Specification 36.211 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from a base station, access point or eNodeB (eNB) to a terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, Digital Video Broadcasting (DVB), and Digital Audio Broadcasting (DAB).

Time frequency physical resource blocks (also denoted herein as resource blocks or "RBs" for brevity) may be defined in OFDM systems as groups of transport carriers (e.g. sub-carriers) or intervals that are assigned to transport data. The RBs are defined over a time and frequency period. Resource blocks include time-frequency resource elements (also denoted here in as resource elements or "REs" for brevity), which may be defined by indices of time and frequency in a slot. Additional details of LTE RBs and REs are described in, for example, 3GPP Specification TS 36.211.

UMTS LTE may support scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain a radio frame may be defined to be 10 ms long and include 10 subframes of 1 millisecond (ms) each. Every sub frame consists of 2 slots, where each slot is 0.5 ms. The subcarrier spacing in the frequency domain in this case is 15 kHz. Twelve of these subcarriers together (per slot) constitute an RB, so in this implementation one resource block occupies a channel bandwidth of 180 kHz. 6 Resource blocks occupy a channel bandwidth of 1.4 MHz and 100 resource blocks fit in a channel bandwidth of 20 MHz.

In the downlink there are typically a number of physical channels as described above. In particular, the physical downlink control channel (PDCCH) is used for sending control information, the physical hybrid ARQ indicator channel (PHICH) for sending ACK/NACK, the physical control format indicator channel (PCFICH) for specifying the number of control symbols, the Physical Downlink Shared Channel (PDSCH) for data transmission, the Physical Multicast Channel (PMCH) for broadcast transmission using a Single Frequency Network (SFN), and the Physical Broadcast Channel (PBCH) for sending important system information within a cell. Supported modulation formats on the PDSCH in LTE include QPSK, 16QAM and 64QAM. Various modulation and coding schemes are defined for the various channels in the 3GPP specification.

In the uplink there are typically three physical channels. The Physical Random Access Channel (PRACH) is used for initial access and data transmission. When the UE is not uplink synchronized, data is sent on the Physical Uplink Shared Channel (PUSCH). If there is no data to be transmitted on the uplink for a UE, control information is transmitted on the Physical Uplink Control Channel (PUCCH). Supported modulation formats on the uplink data channel include QPSK, 16QAM and 64QAM.

If virtual MIMO/spatial division multiple access (SDMA) is introduced the data rate in the uplink direction can be increased depending on the number of antennas at the base station. With this technology more than one mobile device can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "terminal," "user device," or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates details of an implementation of a multiple access wireless communication system, which may be an LTE system, on which aspects as further described subsequently may be implemented. A base station or evolved NodeB (eNB) 100 (also know as an access point or AP) may include multiple antenna groups, one including 104 and 106, another including 108 and 110, and an additional one including 112 and 114. In FIG. 1, only two antennas are shown for each antenna group, however, more or fewer antennas may be utilized for each antenna group. The antennas of base station 100 may define a coverage area of a cell associated with the base station.

A user terminal or user equipment (UE) 116 (also known as an access terminal or AT) may be within the cell coverage area and may be in communication with antennas 112 and 114, where antennas 112 and 114 transmit information to UE 116 over forward link (also known as a downlink or DL) 120 and receive information from UE 116 over a reverse link (also known as an uplink or UL) 118. A second UE 122 (and/or additional terminals or UEs not shown) may be in communication with other antennas, such as antennas 106 and 108, where antennas 106 and 108 may transmit information to UE 122 over forward link 126 and receive information from UE 122 over reverse link 124. Other antennas, such as antenna 104 (and/or other antennas not shown) may be used to communicate between UES 116, 122, and/or other UE or wireless network nodes (not shown).

In a frequency division duplex (FDD) system, communication links 118, 120, 124 and 126 use different frequencies for communication. For example, forward link 120 may use a different frequency then that used by reverse link 118. In a time division duplex (TDD) system, downlinks and uplinks may share the same spectrum.

Each group of antennas and/or the area in which they are designed to communicate is often referred to as a sector of the base station, and may be associated with sector coverage areas, which may be sub-areas of the base station cell coverage area. Antenna groups may each be designed to communicate to UEs in a sector of the cell area covered by eNB 100. In communication over forward links 120 and 126, the transmitting antennas of eNB 100 may utilize beam-forming in order to improve the signal-to-noise ratio of forward links for the different access terminals 116 and 122. Also, an eNB may use beam-forming to transmit to UEs scattered randomly through its coverage area, which may cause less interference to UEs in neighboring cells than an eNB transmitting through a single antenna to all its UEs.

An eNB, such as eNB 100, may be a fixed station used for communicating with the UEs and may also be referred to as an access point, a Node B, or some other equivalent terminology. In some system configurations, such as heterogenous networks, the base station or eNB may be one of a variety of types and/or power levels. For example, the eNB may be associated with a macrocell, femtocell, picocell, and/or other type of cell. The eNB may be one of a range of different power levels, such as one of a type of macrocell eNB having any of a range of power levels.

A user terminal or UE may also be denoted as an access terminal, AT, user equipment, wireless communication device, terminal, or some other equivalent terminology. A user terminal may be implemented in the form of a wireless handset, computer or wireless module or device for use with a computer, personal digital assistant (PDA), tablet computer or device, or via any other similar or equivalent device or system.

Figure 2:
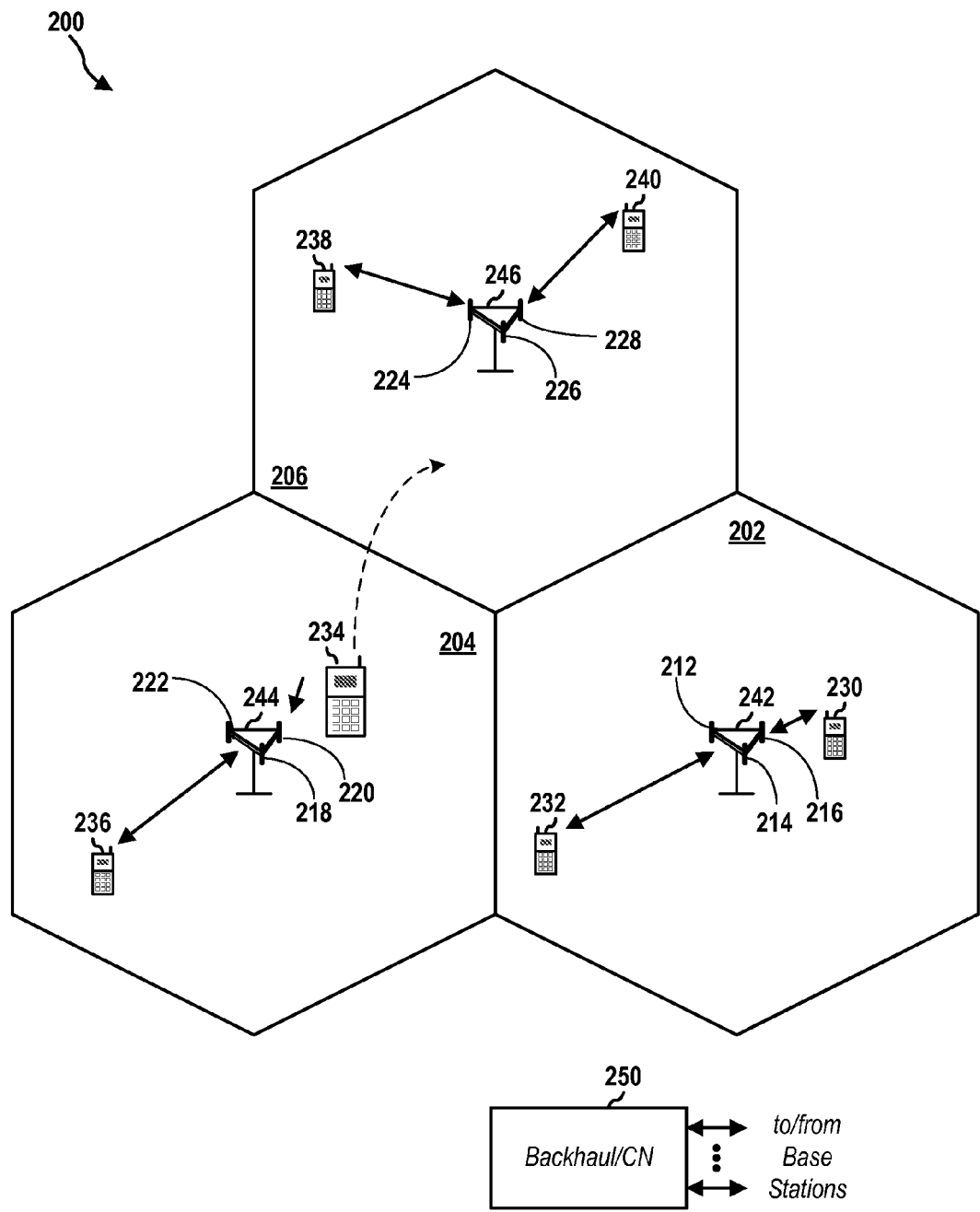
FIG. 2 illustrates details of a wireless communications system having multiple cells.

Attention is now directed to FIG. 2, which illustrates details of a wireless communication network 200, which may be an LTE network. Wireless network 200 may include a number of base stations or evolved Node Bs (eNBs) as well as other network entities. An eNB may be a base station that communicates with user terminals or UEs and may also be referred to as Node B, access point, AP, etc. Each base station or eNB may provide communication coverage for a particular geographic coverage area and/or time and/or frequency-multiplexed coverage area.

As shown in FIG. 2, example communication network 200 includes cells 202, 204, and 206, which each have associated base stations or eNBs 242, 244, and 246, respectively. While cells 202, 204, and 206 are shown adjacent to each other, the coverage area of these cells and associated eNBs may overlap and/or be contiguous with each other. For example, an eNB, such as eNBs 242, 244, and 246 may provide communication coverage for a macro cell, a picocell, a femtocell, and/or other types of cell. A macrocell may cover a relatively large geographic area (e.g., several kilometers in radius) and may allow unrestricted access by UEs with service subscription. A picocell may cover a relatively small geographic area, may overlap with one or more macrocells, and/or may allow unrestricted access by UEs with service subscription. Likewise, a femtocell may cover a relatively small geographic area (e.g., a home), may overlap with a macrocell and/or picocell, and/or may allow restricted access only to UEs having association with the femtocell, e.g., UEs for users in the home, UEs for users subscribing to a special service plan, etc. An eNB for a macrocell may be referred to as a macro eNB or macro base station or macrocell node. An eNB for a picocell may be referred to as a pico eNB, pico base station or picocell node. An eNB for a femtocell may be referred to as a femto eNB, home eNB, femto base station or femtocell node.

Figure 4A:
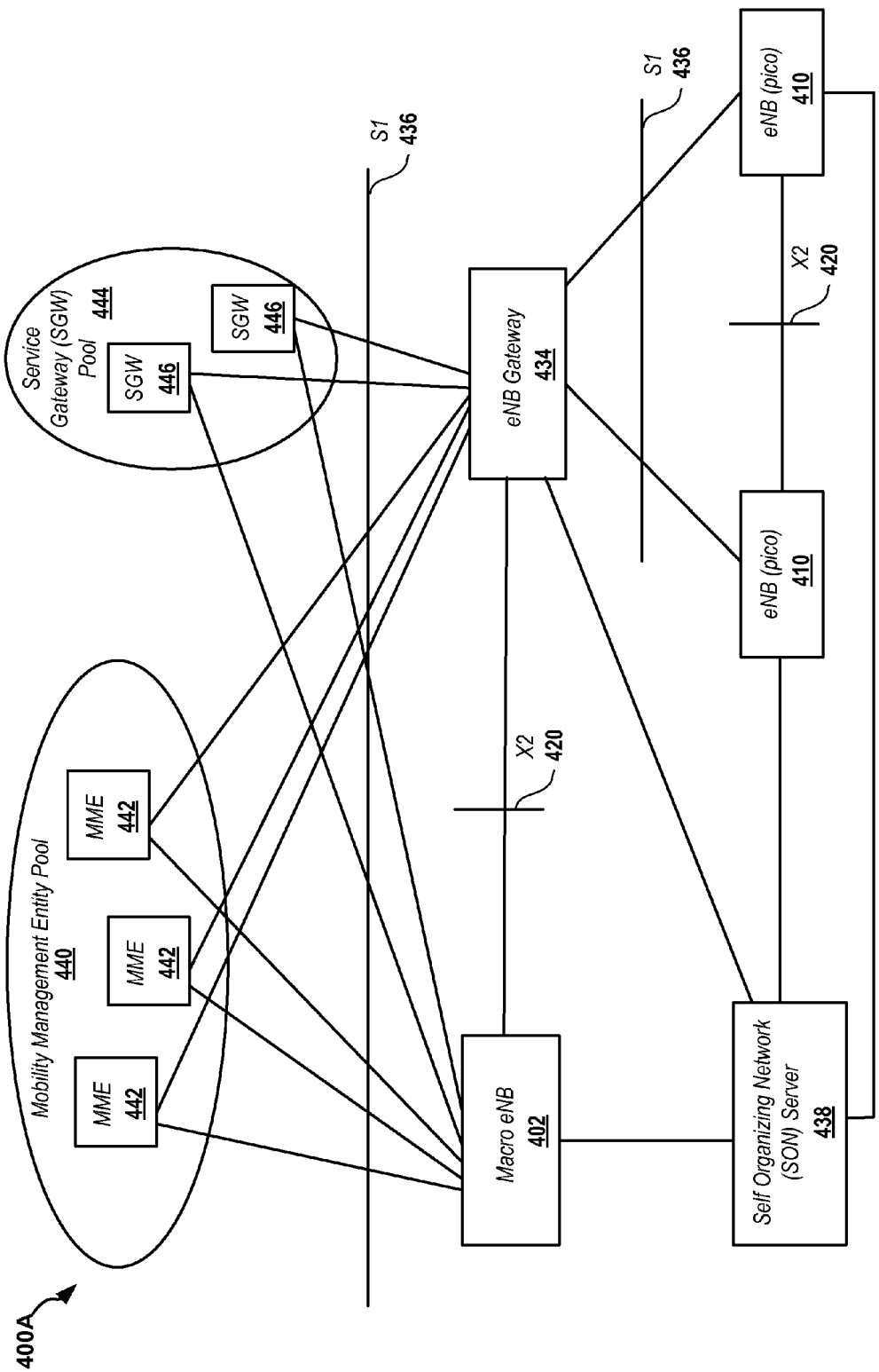
FIG. 4A illustrates details of inter-node connections in a wireless communication system.
Figure 4B:
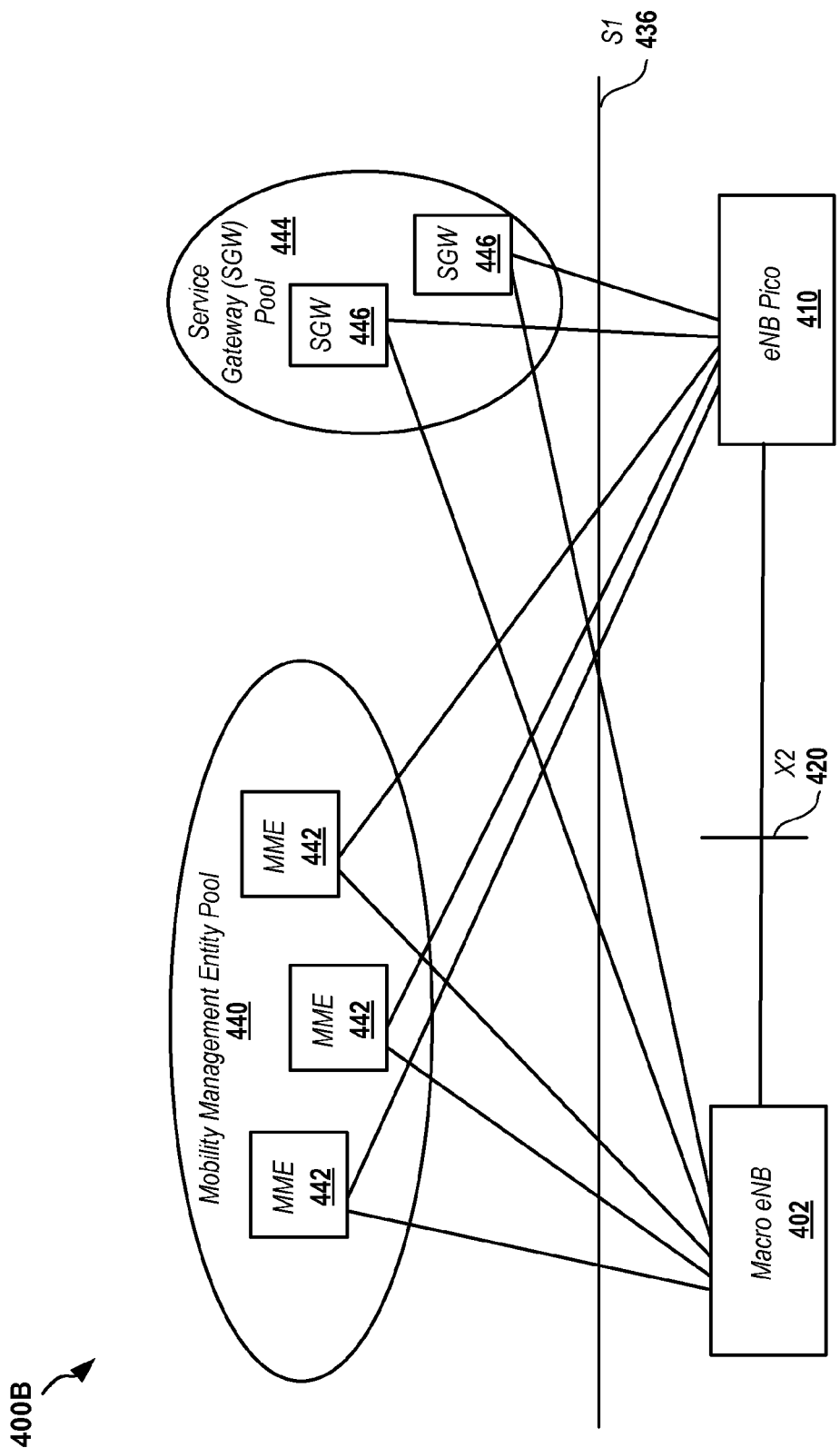
FIG. 4B illustrates another example of inter-node connections in a wireless communication system without a SON server.

A backhaul/network controller element 250 may couple to a set of eNBs and provide coordination and control for these eNBs. Network controller 250 may be a single network entity or a collection of network entities. Network controller 250 may facilitate communications with eNBs 242, 244, and 246 via a backhaul connection and/or with a core network (CN) function. eNBs 242, 244, and 246 may also communicate with one another, e.g., directly or indirectly via wireless or wireline backhaul, such as, for example, as shown in FIGS. 4A and 4B.

In some implementations, wireless network 200 may be a homogeneous network that includes only macro base stations or eNBs. Wireless network 200 may also be a heterogeneous network or hetnet that includes eNBs of different types, e.g., macro eNBs, pico eNBs, femto eNBs, relay nodes (RNs), etc. These different types of eNBs may have different transmit power levels, different coverage areas, and different impact on interference in wireless network 200.

For example, macro eNBs may have a high transmit power level (e.g., 20 Watts) whereas pico eNBs, femto eNBs, and relays may have a lower transmit power level (e.g., 1 Watt). The various techniques and aspects described herein may be used in different implementations for homogeneous and heterogeneous networks.

Network 200 may include one or more user terminals or UEs. For example, network 200 may include UEs 230, 232, 234, 236, 238 and 240 (and/or other UEs not shown). The various UEs may be dispersed throughout wireless network 200, and each UE may be stationary, mobile, or both. A UE may also be referred to as a terminal, a mobile station, a subscriber unit, a station, etc. For example, a UE may be a cellular phone, a personal digital assistant (PDA), a wireless modem, a wireless communication device, a handheld device, a laptop computer, a cordless phone, a wireless local loop (WLL) station, a pad or table device, etc. As described previously, a UE may communicate with an eNB via a downlink (DL) and an uplink (UL). The downlink (or forward link) refers to the communication link from the eNB to the UE, and the uplink (or reverse link) refers to the communication link from the UE to the eNB. A UE may be able to communicate with macro eNBs, pico eNBs, femto eNBs, relay nodes, and/or other types of eNBs. In FIG. 2, a solid line with double arrows indicates desired transmissions between a UE and a serving eNB, which is an eNB designated to serve the UE on the downlink and/or uplink. UEs, such as those shown in FIG. 2, may create interference with each other and/or may receive interference from the various base stations or eNBs. Alternately, or in addition, UEs may move from a connection with one base station to another base station, such as due to UE mobility, interference, loading, etc. As noted previously, communications between base stations may be done directly and/or in conjunction with a backhaul network. For example, communications between base stations may be done in conjunction with establishing new connections such as during forward handovers, in the event of a radio link failure, or during other events such as cell overloading, transition to other network types, etc. Various aspects related to improving connection transfers and handover performance are described subsequently herein.

Figure 3:
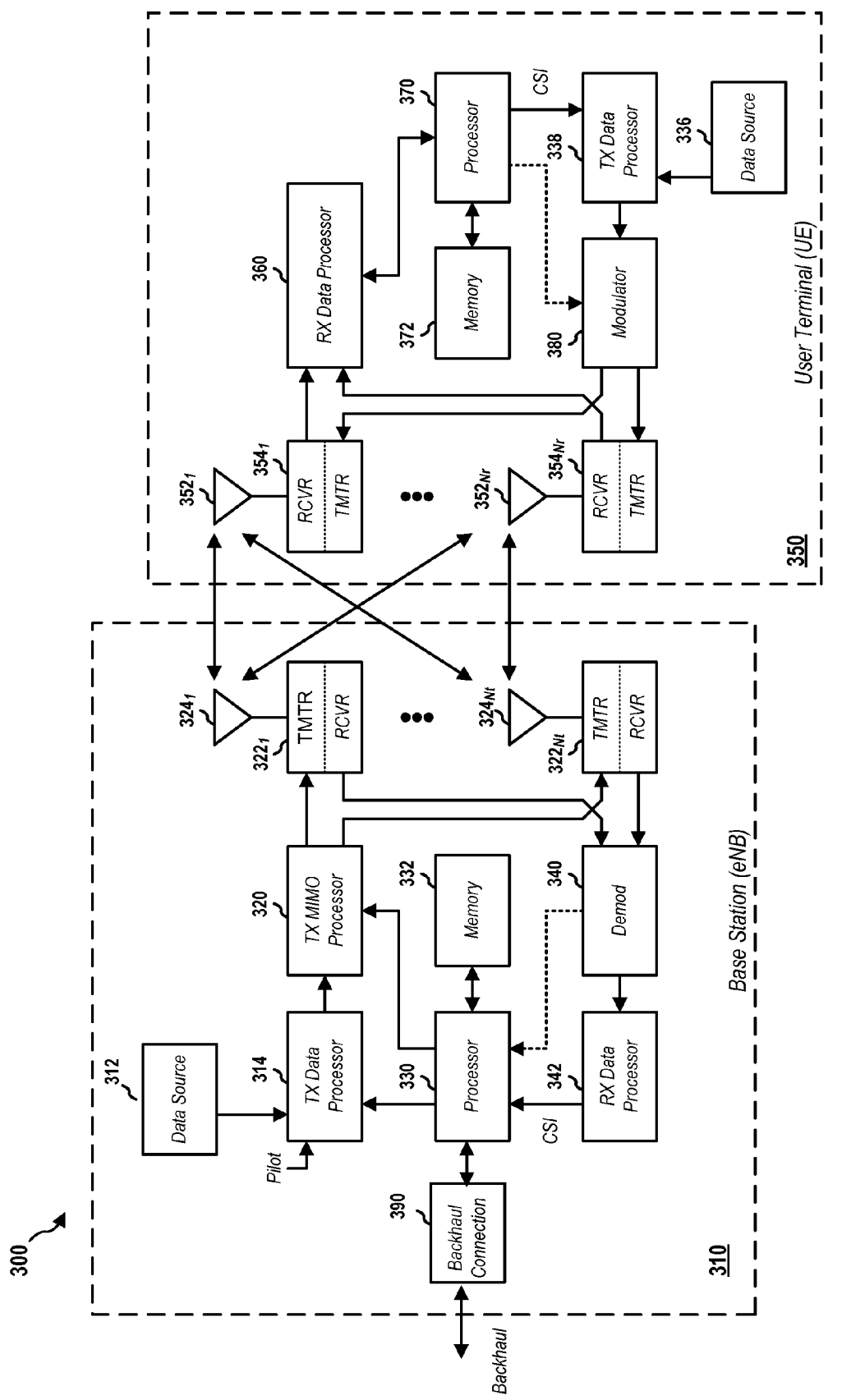
FIG. 3 illustrates details of an embodiment of a base station and user terminal in a wireless communication system.

Attention is now directed to FIG. 3, which illustrates a block diagram of an embodiment of base station 310 (i.e., an eNB, HeNB, etc.) and a user terminal 350 (i.e., a UE, terminal, AT etc.) in an example LTE communication system 300, on which aspects and functionality as described subsequently herein may be implemented. In particular, base station 310 and UE 350 may be configured to perform the connection/handover related procedures described subsequently herein, including in FIG. 6. eNB 350 and UE 310 may correspond with, for example, the base stations and user terminals shown in FIGS. 1, 2, 4A, 4B, 5, and 7.

Various functions may be performed in the processors and memories as shown in base station 310 (and/or in other components not shown), such as communications with other base stations (not shown) of other cells and/or networks, to transmit and receive signaling from the other base stations and UEs, as well as to provide other functionality as described herein.

For example, UE 350 may include one or more modules to receive signals from base station 310 and/or other base stations (not shown, such as non-serving base stations or base stations of other network types as described previously herein) to access base stations, receive DL signals, determine channel characteristics, perform channel estimates, demodulate received data and generate spatial information, determine power level information, and/or other information associated with base station 310 or other base stations (not shown).

In one embodiment, base station 310 may coordinate with other base stations as described herein to facilitate operations such as forward handovers. This may be done in one or more components (or other components not shown) of base station 310, such as processors 314, 330 and memory 332. Base station 310 may also include a transmit module including one or more components (or other components not shown) of eNB 310, such as transmit modules 322. Base station 310 may include an interference cancellation module including one or more components (or other components not shown), such as processors 330, 342, demodulator module 340, and memory 332 to provide functionality such as redirection of served UEs, communication with associated MMEs, or other network nodes, signaling redirection information, PS suspension information, handover and context information, and/or other information such as is described herein.

Base station 310 may include a processor module including one or more components (or other components not shown), such as processors 330, 314 and memory 332 to perform base station functions as described herein and/or manage transmitter and/or receiver modules, which may be used to communicate with UEs or other nodes, such as other base stations, MMEs, etc. Base station 310 may also include a control module for controlling receiver functionality. Base station 310 may include a network connection module 390 to provide networking with other systems, such as backhaul connections, connections to CN elements, as well as other base stations/eNBs, such as via module 390, or with other components such as are shown in FIGS. 1-2, and 4A and 4B.

Likewise, UE 350 may include a receive module including one or more components of UE 350 (or other components not shown), such as receivers 354. UE 350 may also include a processor module including one or more components (or other components not shown) of UE 350, such as processors 360 and 370, and memory 372, to perform the processing functions associated with user terminals as described subsequently herein. This may include, for example, initiating new connections/handovers, declaring failures, such as RLF, performing access procedures, etc.

In one embodiment, one or more signals received at UE 350 are processed to receive DL signals and/or extract information such as MIB and SIB information from the DL signals. Additional processing may include estimating channel characteristics, power information, spatial information, and/or other information associated with eNBs, such as base station 310 and/or other base stations, such as Node Bs (not shown), facilitating redirection commands, searching for and locating redirection targets and alternate targets, such as fallback targets, as well as facilitating communicating with other cells or networks and associated nodes, such as base stations or Node Bs of those different networks.

Memory 332 (and/or other memories of base station 310 that are not shown in FIG. 3) may be used to store computer code for execution on one or more processors, such as processors 314, 320, 330, and 342 (and/or other processors of base station 310 that are not shown) to implement processes associated with the aspects and functionality described herein, and in particular with regard to FIGS. 7, 8, 9, 10, and 12-14. Likewise, memory 372 (and/or other memories of user terminal 350 that are not shown) may be used to store computer code for execution on one or more or more processors, such as processors 338, 360, and 370 to implement processes associated with the aspects and functionality described herein. The memories may be used, for example, to store information such as context information, cell and user terminal identity information, as well as other information associated with wireless device and system operation.

In operation, at the base station 310, traffic data for a number of data streams may be provided from a data source 312 to a transmit (TX) data processor 314, where the data may be processed and transmitted to one or more UEs 350. In one aspect, each data stream is processed and transmitted over a respective transmitter sub-system (shown as transmitters $322_1$-$322_{Nt}$ and antennas $324_1$-$324_{Nt}$) of base station 310. TX data processor 314 receives, formats, codes, and interleaves the traffic data for each data stream based on a particular coding scheme selected for that data stream so as to provide coded data. In particular, base station 310 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 314 as shown in FIG. 3 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 330 based on instructions stored in memory 332, or in other memory or instruction storage media of UE 350 (not shown).

The modulation symbols for all data streams may then be provided to a TX MIMO processor 320, which may further process the modulation symbols (e.g., for OFDM implementation). TX MIMO processor 320 may then provide Nt modulation symbol streams to Nt transmitters (TMTR) $322_1$ through $322_{Nt}$. The various symbols may be mapped to associated RBs for transmission.

TX MIMO processor 320 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose($[b_1\ b_2\ \ldots\ b_{Nt}]$) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as $B_1x_1+B_2x_2+B_{Ns}x_{Ns}$, where Ns beams are transmitted and $x_i$ is the modulation symbol sent using beam $B_i$. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $322_1$ through $322_{Nt}$ receives and processes a respective symbol stream to provide one or more analog signals, and further conditions (e.g., amplifies, filters, and upconverts) the analog signals to provide a modulated signal suitable for transmission over the MIMO channel. Nt modulated signals from transmitters $322_1$ through $322_{Nt}$ are then transmitted from Nt antennas $324_1$ through $324_{Nt}$, respectively.

At UE 350, the transmitted modulated signals are received by Nr antennas $352_1$ through $352_{Nr}$, and the received signal from each antenna 352 is provided to a respective receiver (RCVR) $354_1$ through $352_{Nr}$. Each receiver 354 conditions (e.g., filters, amplifies and downconverts) a respective received signal, digitizes the conditioned signal to provide samples, and further processes the samples to provide a corresponding "received" symbol stream.

An RX data processor 360 then receives and processes the Nr received symbol streams from Nr receivers $354_1$ through $352_{Nr}$, based on a particular receiver processing technique so as to provide Ns "detected" symbol streams so at to provide estimates of the Ns transmitted symbol streams. The RX data processor 360 then demodulates, deinterleaves, and decodes each detected symbol stream to recover the traffic data for the data stream. The processing by RX data processor 360 is typically complementary to that performed by TX MIMO processor 320 and TX data processor 314 in base station 310.

A processor 370 may periodically determine a precoding matrix. Processor 370 may then formulate a reverse link message that may include a matrix index portion and a rank value portion. In various aspects, the reverse link message may include various types of information regarding the communication link and/or the received data stream. The reverse link message may then be processed by a TX data processor 338, which may also receive traffic data for a number of data streams from a data source 336 which may then be modulated by a modulator 380, conditioned by transmitters $354_1$ through $354_{Nr}$, and transmitted back to base station 310. Information transmitted back to base station 310 may include power level and/or spatial information for providing beamforming to mitigate interference from base station 310.

At base station 310, the modulated signals from UE 350 are received by antennas 324, conditioned by receivers 322, demodulated by a demodulator 340, and processed by a RX data processor 342 to extract the message transmitted by UE 350. Processor 330 may then determine which pre-coding matrix to use for determining beamforming weights, and then processes the extracted message.

Attention is now directed to FIG. 4A, which illustrates details of one example network embodiment 400A of interconnection between eNBs and other wireless network elements, such as may be used during handovers or for other inter-cell communication and/or coordination. Network 400A may include a macro-eNB 402 and/or multiple additional eNBs, which may be picocell eNBs 410 (or, for example other macrocell eNBs, femtocell eNBs, etc. not shown). Network 400A may include an eNB gateway (or other gateway type) 434, which may be, for example, an HeNB gateway, for scalability reasons.

The macro-eNB 402 and the gateway 434 may each communicate with a pool 440 of mobility management entities (MME) 442 and/or a pool 444 of serving gateways (SGW) 446. The eNB gateway 434 may appear as a C-plane and a U-plane relay for dedicated S1 connections 436. An S1 connection 436 may be a logical interface specified as the boundary between an evolved packet core (EPC) and an Evolved Universal Terrestrial Access Network (EUTRAN). As such, it provides an interface to a core network (CN) (not shown) which may be further coupled to other networks.

The eNB gateway 434 may act as a macro-eNB 402 from an EPC point of view. The control plane (C-plane) interface may be an S1-MME and the U-plane interface may be an S1-U. Transfer of information, such as during handover or new connection establishment, may be done by direct communication between eNBs such as those shown in FIG. 4A, and/or may be done in conjunction with a backhaul network, such as via backhaul interface 250 as shown in FIG. 2.

The eNB gateway 434 may act towards an eNB 410 as a single EPC node. The eNB gateway 434 may ensure S1-flex connectivity for an eNB 410. The eNB gateway 434 may provide a 1:n relay functionality such that a single eNB 410 may communicate with n MMEs 442. The eNB gateway 434 may register towards the pool 440 of MMEs 442 when put into operation via the S1 setup procedure. The eNB gateway 434 may support setup of S1 interfaces 436 with the eNBs 410.

Network 400A may also include a self organizing network (SON) server 438. The SON server 438 may provide automated optimization of a 3GPP LTE network. The SON server 438 may be a key driver for improving operation administration and maintenance (OAM) functions in the network 400A.

An X2 link 420 may exist between the macro-eNB 402 and the eNB gateway 434. X2 links 420 may also exist between each of the eNBs 410 connected to a common eNB gateway 434. The X2 links 420 may be set up based on input from the SON server 438. An X2 link 420 may convey inter-cell interference coordination (ICIC) information. If an X2 link 420 cannot be established, the S1 link 436 may be used to convey ICIC information. Information may be exchanged using these links, for example, in the case of connection establishment and/or handovers.

Backhaul signaling may be used in communication system 400A to manage various functionality as described further herein between macro-eNB 402 and eNBs 410. For example, these connections may be used as further described successively herein to facilitate connection establishment and handovers.

FIG. 4B illustrates another example embodiment of a network 400B of eNB interconnection with other eNBs and wireless network elements including a similar configuration of elements as shown in FIG. 4A. In network 400B, however, no SON server is included, and macro eNBs, such as eNB 402, may communicate directly with other eNBs, such as pico eNB 410 (and/or with other base stations that are not shown). While FIGS. 4A and 4B are shown for purposes of illustration of example inter-cell connectivity, other configurations for providing connectivity between base stations and other network elements may also be used in various implementations.

As described previously with respect to FIG. 2, a user terminal or UE may desire to establish a connection with a new base station or eNB, such as, for example, when the UE is moving, declares radio link failure (RLF), or otherwise wishes to establish a connection with a different cell. In performing such a connection, base stations in various cells may communicate to share information, such as context information associated with the UE. This information done via connections such as shown in FIGS. 4A and 4B, and may be based on information provided from the UE during connection establishment, such as cell identity and user terminal identity information.

Figure 5:
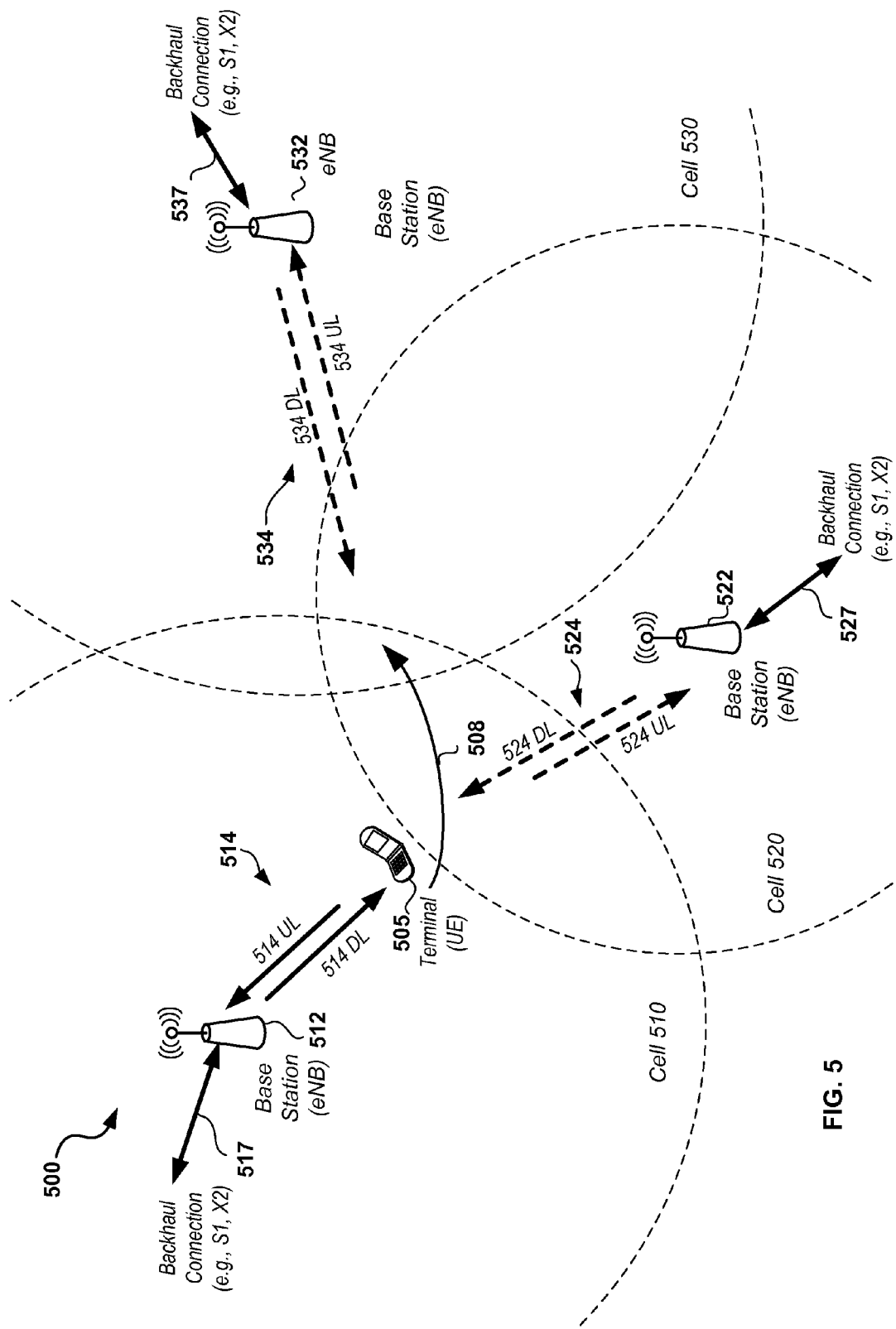
FIG. 5 illustrates details of an example wireless communication system on which a handover procedure may be implemented.

Attention is now directed to FIG. 5, which illustrates details of a wireless network on which a connection process, such as may be performed during a forward handover, may be effected between cells in a wireless communication system 500. As shown, communication system 500 includes three cells, denoted as cell 510, cell 520, and cell 530. Each cell includes an associated base station, such as an eNB. For example, base station 512 may be associated with cell 510 and serve one or more user terminals, such as UEs, within the coverage area of cell 510. Similarly, cells 520 and 530 may have associated base stations 522 and 532, respectively. It is noted that, while system 500 is shown as including three cells 510, 520, and 530, various other system configurations having different numbers of cells, cell coverage areas, base station types, as well as other configuration elements may also be used consistent with the various aspects of the disclosure. As such, system 500 is shown with three cells in the particularly illustrated configuration for purposes of illustration and not limitation.

One or more of cells 510, 520, 530, and/or other cells (not shown) may be LTE cells within an LTE network. In addition, in some configurations, other cells and associated cell types, such as UTRAN, GSM Radio Access Network (GERAN), etc. (not shown) may be included in system 500. As described subsequently herein, handovers and associated procedures are illustrated in the context of an LTE system, however, in some cases other wireless network types may also be included as part of the handover process. For example, a terminal initially served by an LTE cell may be handed over to a UTRAN or GERAN network cell, and may subsequently attempt to re-establish communication with the LTE cell or another LTE cell. Other inter-network handover procedures may also be done consistent with various aspects of the disclosure.

One or more user terminals, such as terminal 505, which may be a user equipment (UE), may be in communication with cells within network 500. For example, user terminal or UE 505 may initially be in communication with base station 512 in cell 510 via a connection such as connection 514 as shown in FIG. 5. Connection 514 may include a downlink (DL) between base station 512 and terminal 505 and an uplink (UL) between terminal 505 and base station 512. While operating in cell 510, the UE may have an associated UE identity, such as an S-TMSI, C-RNTI & random number (which may be generated by the UE during connection setup), and/or other UE specific identity information. The UE identity may be provided by the base station, such as eNB 512, which may provide the S-TMSI/C-RNTI. Likewise, the UE may be provided with and store a cell-specific identity, such as a PCI.

In operation, terminal 505 may initially be served by base station 512 of cell 510, but may wish to establish a connection with another cell and its associated base station or eNB, such as cell 520 and/or cell 530. For example, in one case, terminal 505 may be a mobile terminal, such as a UE being operated in a vehicle or otherwise in movement, such as via path 508 as shown in FIG. 5. In this case, terminal 305 may be handed over to another of the base stations, such as when moving out of the coverage area of the first or current cell (e.g., cell 510) and into the coverage area of a second or target cell (e.g., cell 520). This may be done as part of a handover procedure. Alternately or in addition, the new connection may be initiated based on other events, such as determination of conditions of radio failure and declaration of radio link failure (RLF) by the terminal, cell loading, etc.

In the case of terminal movement or mobility, terminal 505 may initially be served by base station 512 of cell 510, but may be moving towards cells 520 and 530. For example, terminal 505 may initially move into the coverage area of cell 520, such as via path 508, and may wish to establish a connection 524 with base station 522 of cell 520. Based on a connection established between UE 505 and base station 512, the base station 512 may store context information associated with UE 505, such as, for example, Data Radio Bearer (DRB) setup information, user subscription information, and/or other information related to the UE. The UE context information may be transferred or moved to another base station of another cell during UE mobility procedures, such as during handovers.

In addition, UE 505 may have stored first identity information associated with cell 510 and base station 512 as described previously. For example, the cell identity may be the Physical Cell Identity (PCI) and the UE identity may be an allocated SAE Temporary Mobile Subscriber Identity (S-TMSI), Cell Radio Network Temporary Identifier (C-RNTI) and/or random number that may be generated by the base station 512, and/or other UE specific identity information. This first identity information may be denoted for purposes of explanation herein as PCI1 and S-TMS1 or C-RNTI1. However, it will be apparent that other cell and UE-specific identity information (in place of or in addition to PCI, S-TMSI, and/or C-RNTI information) may also be used in various implementations.

In order to effect such an inter-eNB transfer, the UE 505 may begin the process of connecting with base station 522, such as is defined in the 3GPP Specifications, including 3GPP TS 23.401 and 3GPP TS 36.331. This may be based on a handover request generated by base station 512, which may be done via inter-cell connectivity such as shown in FIGS. 4A and 4B. For example, base station 512 may signal, via backhaul connection 517, which may be, for example, an S1 or X2 connection, the handover request. Handover related information may be received at base station 522 via an analogous backhaul connection 527. Additional details of example handover timing are described subsequently with respect to FIG. 6A and FIG. 6B.

If the connection process between UE 505 and base station 522 continues to the stage of the UE 505 receiving an RRC-ConnectionRestablishment message from base station 522, the UE will be in the Radio Resource Control (RRC) connected state (RRC_Connected), and will receive and store second cell identification information (e.g., second cell ID and new UE ID), as well as remove or disregard previous or first cell and UE identities (e.g., first cell ID and UE identification information assigned by the first cell).

However, if an RLF occurs before completion of the forward handover (e.g., the UE 505 fails to complete the connection/handover to base station 522), the UE 505 may then attempt to connect to a third base station and cell, such as base station 532 in cell 530, which may be done via connection 534, or UE 505 may attempt to reconnect to the original cell, such as base station 512 in cell 510, and/or to another cell (not shown) by performing a cell reselection process. In this case, the UE 505 will then use the information associated with base station 522 (e.g., the second cell ID and UE identities associated with base station 522 provided in msg2) to attempt to perform the subsequent connection/handover, such as to base station 532 via connection 534.

However, the subsequent forward handover between UE 505 and base station 532 may then fail because the original cell identity and associated context may not be retrievable due to failure to complete the handover to the second cell. This may cause potentially significant service impact as an RRC Connection process (e.g., transmission of an RRCConnection message and subsequent signaling) may need to be performed to reestablish the connection. For example, data buffered in the source eNB can be received by the target eNB and the target eNB will not need to reestablish the context/connection with an associated MME and Gateway. This may result in better performance and/or prevention of data loss. Conversely, if context is lost, buffered data cannot be retrieved and may have to be resent when a new connection is established.

For example, base station 532 may attempt to receive context information from base station 522, such as via backhaul connection 537, however, base station 522 will be unable to deliver the context information because it may have deleted the fetched context from the source eNB (e.g., eNB 512) since the connection may not have been completed. Moreover, in some cases, this failure process can occur multiple times (e.g., multiple radio link failure (RLF) may occur). Subsequent connection attempts may similarly fail due to failure to retain fetched context because the UE may not have completed the connection setup with the eNBs.

Figure 6A:
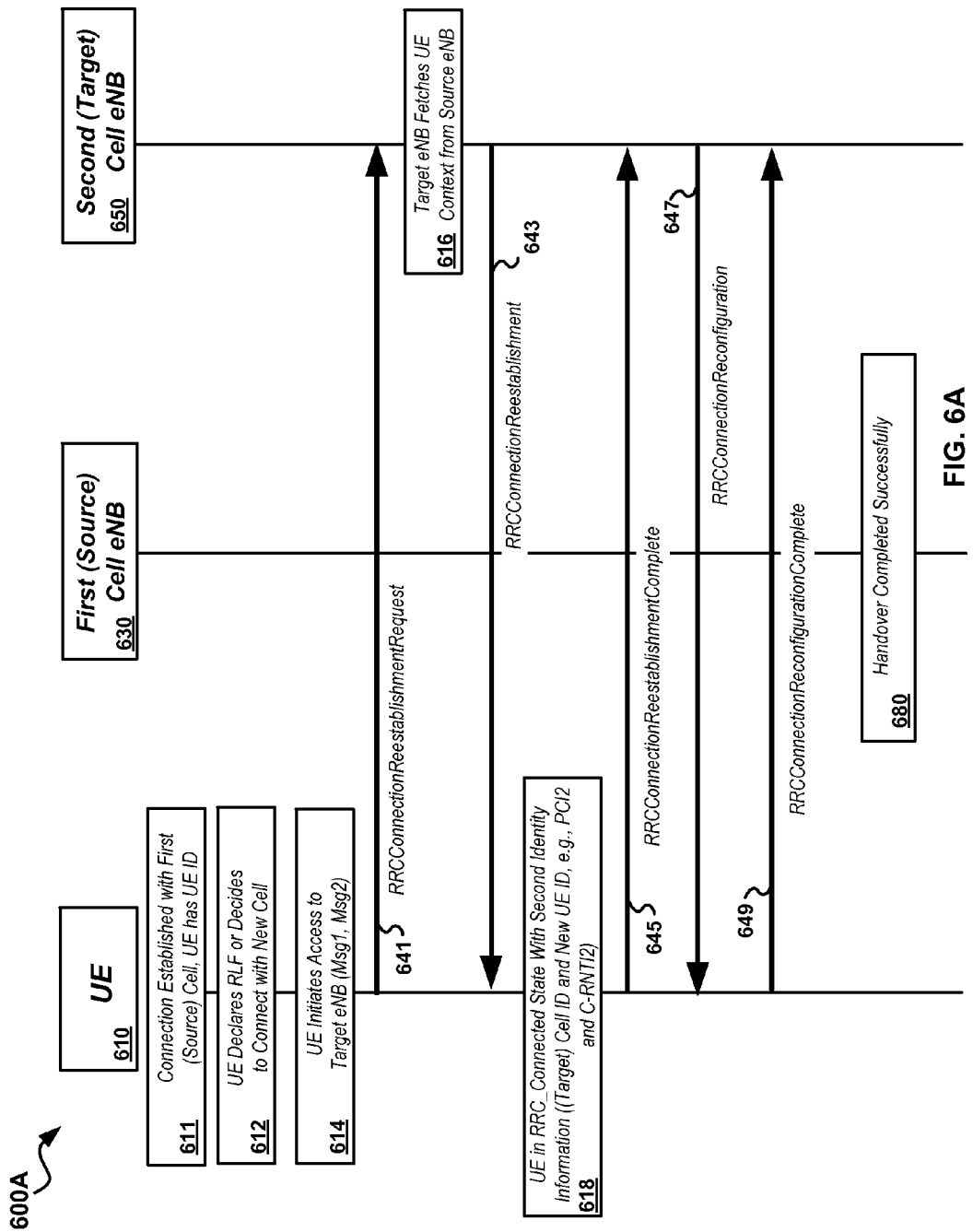
FIG. 6A illustrates a timing diagram for a successful forward handover/radio link failure recovery procedure.

For example, FIG. 6A illustrates a simplified timing diagram of an example handover process 600A where handover of an authenticated UE between first (source) and second (target) cells is properly completed. In this example, a user terminal or UE 610, which may correspond to UE 505 of FIG. 5, is connected at stage 611 and being served by a first base station or eNB 630 of a first cell, which may be, for example, an LTE macrocell, femtocell, picocell, etc. At stage 611, UE 610 has a stored first or source cell UE identity information (UE ID). eNB 630 may correspond with base station 512 and may be serving the cell 510 as shown in FIG. 5. eNB 630 may determine that a handover is appropriate, for example, based on reports from the UE 610, cell loading, mobility information, and/or other similar or related information. For example, eNB 650 may correspond with base station 522 and may be serving cell 520 as shown in FIG. 5. The second cell will typically be another LTE cell; however, in some implementations, the second cell may be a cell using another radio access technology, such as, for example, a UTRAN, GERAN, or other network type.

At stage 612, the UE 610 may detect or determine failure conditions and declare RLF and/or otherwise decide to connect with a new cell. At stage 614, the UE may initiate access to handover target eNB 650. This may include, for example, sending LTE Msg1 to eNB 650 and receiving Msg2, including second identity information, including a second or target UE ID, from eNB 650. UE 610 may then send an RRCConnectionReestablishmentRequest message 641 to eNB 650, which may be followed by transmission of an RRCConnectionReestablishment message 643 (e.g., LTE msg4) from eNB 650. At stage 616, the target cell eNB 650 may fetch UE context information from source cell eNB 630, such as, for example, via connections as shown in FIG. 4A and FIG. 4B. Subsequent to receipt of the RRCConnectionReestablishment message 643, the UE 610 will be in the RRC_Connected stage and will have second identity information assigned by eNB 650.

The second identity information may include, for example, a PCI associated with the second cell (denoted herein as PCI2 for purposes of explanation) and a second UE identity (denoted herein as C-RNTI2 for purposes of explanation). As such, at stage 618, the UE will have the second identity information associated with the target eNB 650, and the handover process may then be continued by sending an RRCConnectionReestablishmentComplete message 645 from UE 610 to the target eNB 650. Subsequent to transmission of the RRCConnectionReestablishmentComplete message 645, the enB 650 may send an RRCConnectionReconfiguration message 647, which may be followed by an RRCCOnnectionReconfigurationComplete message 649 from UE 610. Subsequent to sending of RRCConnectionReconfigurationComplete message 649, the handover may be completed successfully at stage 680. At this point, eNB 650 may resume data transmission to UE 610 using the retrieved context. Various additional aspects and details of this process are further described and illustrated in the 3GPP Specifications, including, for example, 3GPP TS 36.331.

Figure 6B:
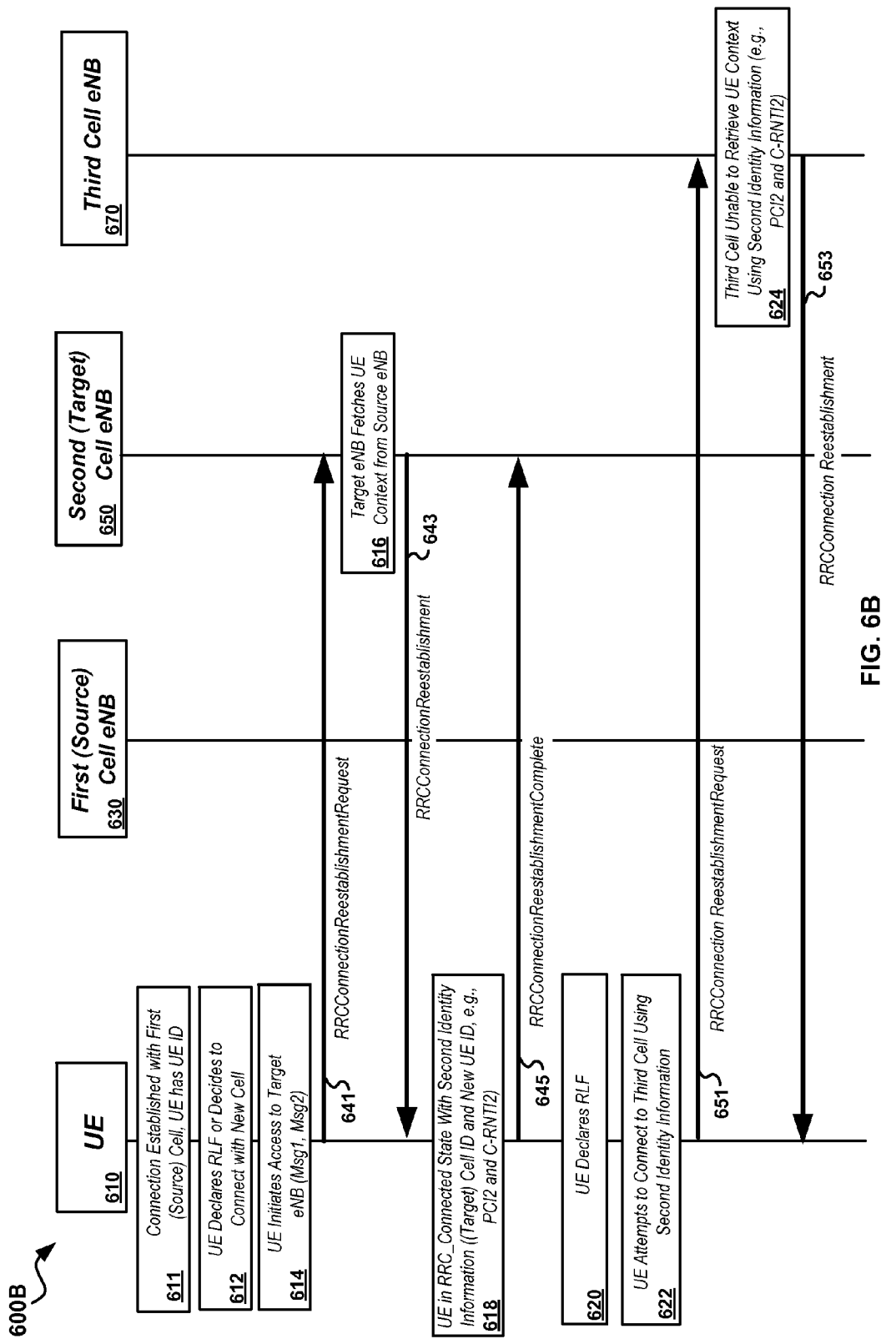
FIG. 6B illustrates a timing diagram for an unsuccessful forward handover/radio link recovery (RLF) procedure where an RLF occurs before establishment of a data connection.

Conversely, FIG. 6B illustrates a timing diagram 600B illustrating an example failed handover as described previously with respect to FIG. 5. In this example, processing may proceed through stage 618 (as shown and described, for example, with respect to FIG. 6A). A failure may, however, occur after the UE has entered the RRC_Connected state subsequent to receipt of the RRCConnectionReestablishment message 643 and/or transmission of RRCConnectionReestablishmentComplete message 645. In this case, the UE may detect or determine failure conditions and declare RLF at stage 620, and then search for and attempt to connect to another cell at stage 622. For example, the UE may return to the first (source) cell (not show diagrammatically in FIG. 6B) or may attempt to connect to a third cell and associated base station or eNB 670, such as by sending another RRCConnectionEstablishmentRequest message 651.

As currently defined in the 3GPP Specifications, for example, in 3GPP TS 36.331, Section 5.3.7, the UE uses the previous cell identity information (subsequent to establishment of RRC_Connected) during subsequent RRCConnectionReestablishment procedures (e.g., PCI2 and C-RNTI2 from the second cell as provided from eNB 650). However, the forward handover/RLF recovery process may fail because base station 670 will be unable to retrieve the UE context for UE 610 at stage 624 since it does not have the initial or first identity information associated with the first (source) cell and associated eNB 630 (e.g. first UE ID information, such as S-TMSI1 or PCI1, C-RNTI1, and the initial random number).

In order to address this problem as well as provide other potential advantages, an alternate handover procedure may be performed by a user terminal, such as UE 505, to facilitate inter-cell handovers/connection establishment. In particular, a UE may maintain first identity information, which may include cell identity information regarding the most recent cell to which the UE was connected and UE specific identity information (e.g., S-TMSI1 or PC1 and C-RNTI1 as described previously with respect to FIGS. 6A and 6B). Then, when the UE seeks to connect to a second base station, such as during a forward handover or RLF event, the UE may retain and use the first identity information until the handover procedure is completed and the second base station has obtained the UE context information from the first base station. If an RLF occurs before completion of the handover procedure, the UE may then use the first identity information to perform one or more subsequent connection attempts (rather than using any new identity information provided from the second base station or other intermediate base stations provided in subsequent connection attempts). In this way, subsequent base stations to which the UE attempts to connect will receive identity information associated with the first base station from which UE context information may be retrieved.

Figure 7:
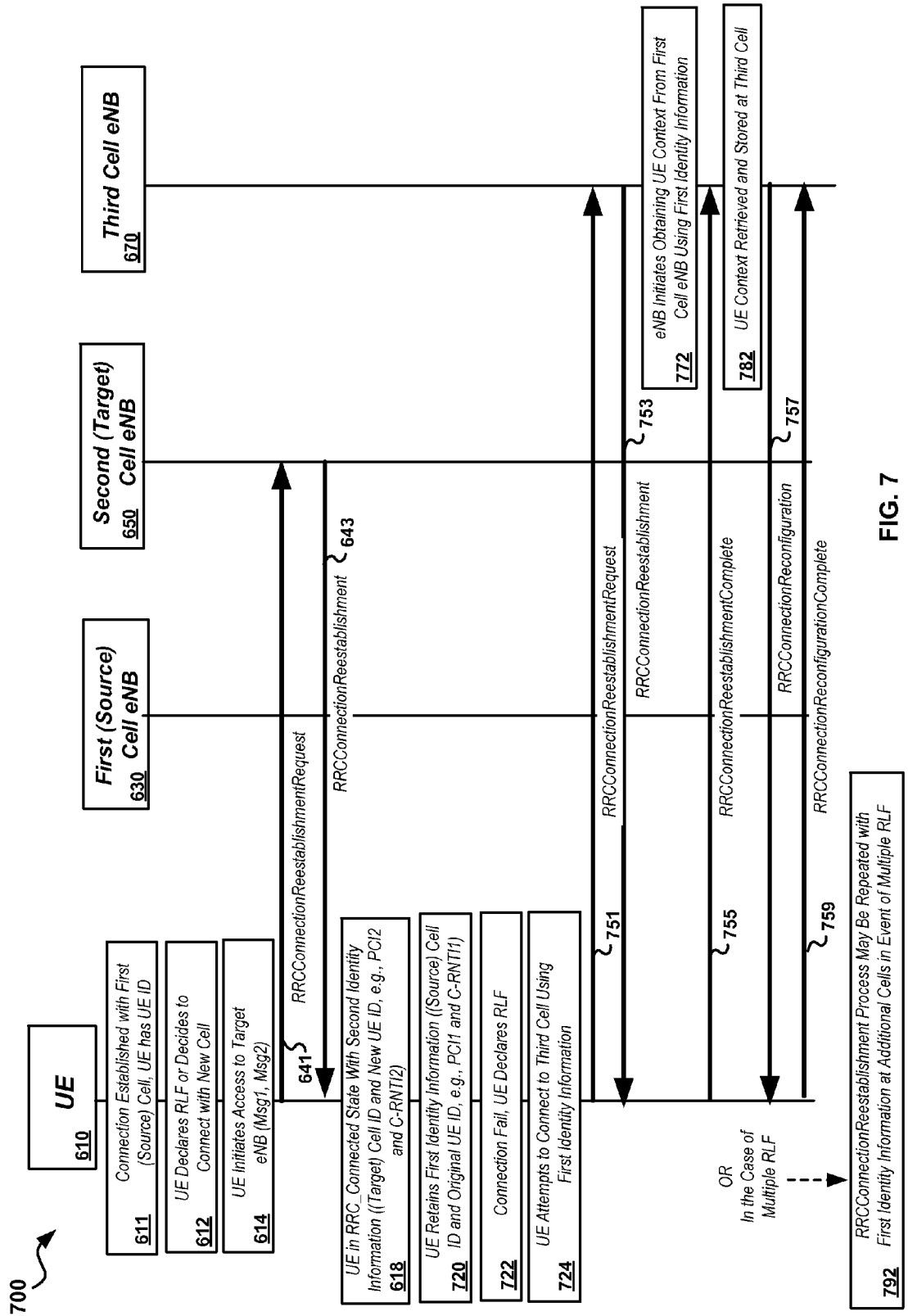
FIG. 7 illustrates a timing diagram for an embodiment of an alternate handover procedure to mitigate the effects of RLF during a forward handover/RLF recovery procedure.

An example of an embodiment of this alternate procedure may be described in conjunction with the timing diagram 700 of FIG. 7. In this example, the handover process may proceed as described previously with respect to FIG. 6A through stage 618 (e.g., receipt second identity information from eNB 650, including PCI2 and C-RNTI2). However, at stage 720, UE 610 may retain the source or first cell identity information. This information may be, for example, a UE identity associated with the first cell, such as S-TMSI1, C-RNTI1 and an initial random number, and/or other UE identity information. The first identity may also include a PCI associated with the first cell and eNB 630, such as PCI1 (e.g., when C-RNTI1 or S-TMSI1 is used). If the connection then fails at stage 722, UE 610 may detect and declare RLF. It is noted that, while the RLF detection and declaration at stage 722 is shown as occurring subsequent to transmission of RRCConnectionReestablishment message 643, in some cases it may occur before transmission of this message. Aspects relating to additional procedures that may be used to address this condition are described subsequently herein. The first identity information may be retained by the UE 610 and used for subsequent connection attempts (rather than using the second identity information) until a data connection is established with another cell.

For example, as shown at stage 724, UE 610 may attempt to connect to another cell. This cell may be, for example, the first cell and associated eNB 630, third cell and associated eNB 650, or another cell. For purposes of illustration, FIG. 7 illustrates transmission of an RRCConnectionReestablishmentRequest message 751 from UE 610 to base station eNB 670 of a third cell, however, as noted previously, reconnection may also be attempted in some cases with the first cell, second cell, or another cell (not shown). In particular, at stage 724, UE 610 may again use the first cell identity (e.g., S-TMSI1 or C-RNTI1, first random number and PCI1) in performing the RRCConnectionReestablishmentRequest procedure, rather than a subsequently received identity (such as PCI2 and C-RNTI2). eNB 670 may then reply with an RRCConnectionReestablishment message 753, and may retrieve UE context information from eNB 630 at stage 772 using the first identity information. UE 610 may send an RRCConnectionReconfigurationComplete message 755, and eNB 6709 may send an RRCConnectionReconfiguration message 757, which UE 610 may respond to with RRCConnectionReconfigurationComplete message 759. The UE may confirm receipt of the RRCConnectionReconfiguration message 757 in various ways. For example, the UE may receive a Hybrid Automatic Repeat Request (HARM) ACK/NACK at layer 2, the UE may receive downlink grants from the target eNB, or through other mechanisms. At stage 782, the UE context may be stored and data transmission resumed to the UE 610.

However, in some cases, multiple radio link failures (RLFs) may occur, as shown, for example, at stage 792 (in which case, messages 755, 757, and/or 759 may not be sent, and stages 772 and/or 782 may not be performed. For example, if connection to the third cell and associated eNB 670 fails, UE 610 may then attempt to connect to a fourth cell and associated base station (not shown), or may attempt to reconnect with a previous cell, such as cells 1 or 2. In this case, process stages 720, 722, and/or 724 may be repeated, with the UE using the first identity information for subsequent connection attempts. This may be repeated successively through an arbitrary number of connection attempts, and/or until a termination event occurs, such as expiration of a UE timer such as Timer 311 or a successful connection event. Upon successful connection to the third (or subsequent) base station, the UE may use the newly provided UE ID (e.g., the third ID if the connection to the third base station 670 is successful. In the case of multiple RLF, the UE ID associated with the next successful connection may be used for further communications.

Figure 8:
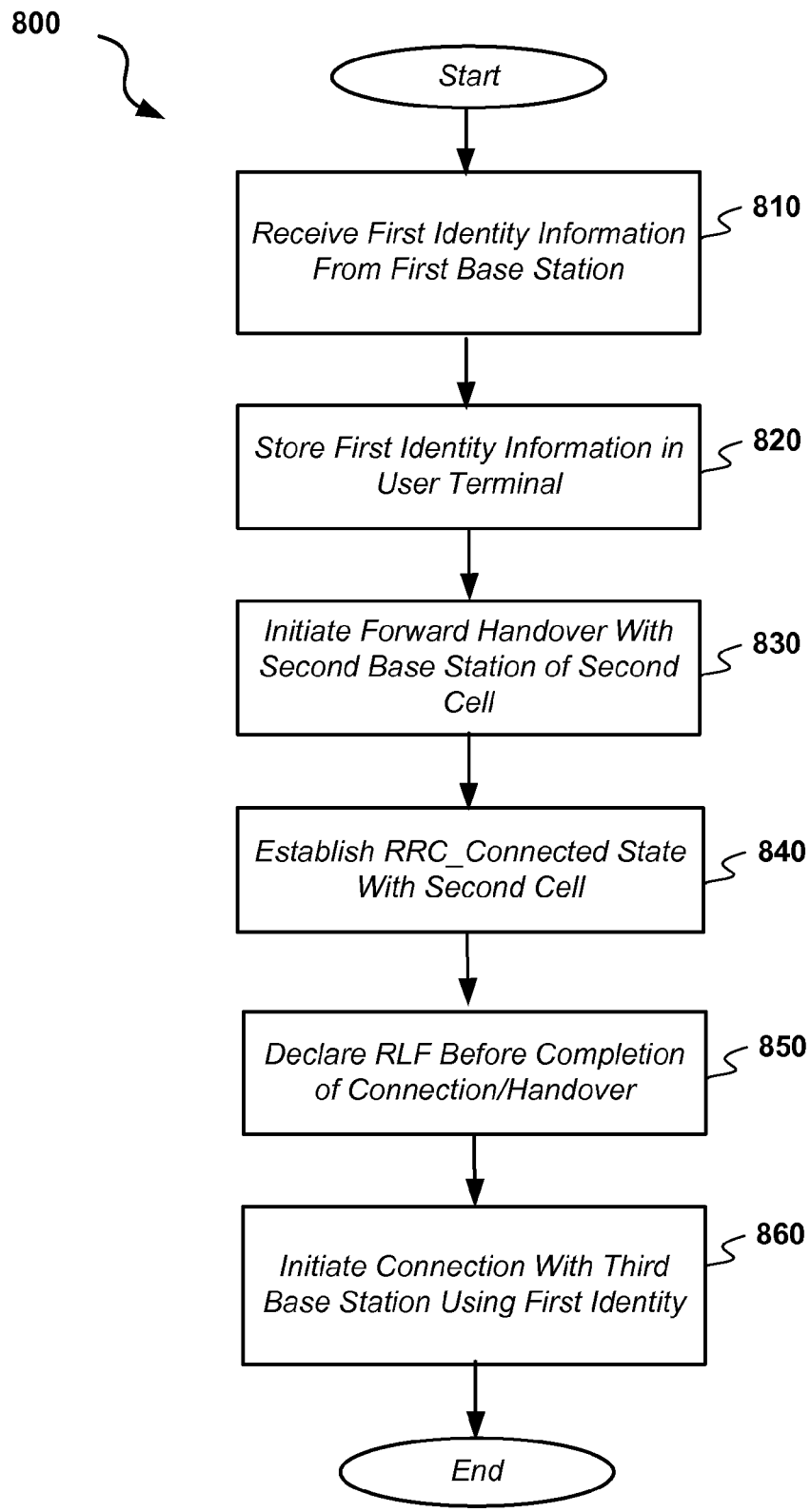
FIG. 8 illustrates details of an embodiment of a process for providing an alternate handover process at a user terminal.

Attention is now directed to FIG. 8, which illustrates details of an embodiment of an example process 800 for facilitating a handover in a wireless communication system. At stage 810, first identity information may be received at a user terminal, such as a UE, which may correspond with UE 505 of FIG. 5 and/or UE 610 of FIG. 7. The information may include first user terminal or UE identity information associating the terminal with the first cell and/or first cell identity information identifying a cell from which the context of the terminal may be retrieved. The first cell identity information may be associated with a first cell, such as cell 510 of FIG. 5, and be provided from a corresponding first base station, such as eNB 512 and/or eNB 630 of FIG. 7. At stage 820, the first identity information may be stored in a memory of the user terminal.

At stage 830, establishment of a connection, such as a forward handover between the first cell and a second cell, between the user terminal and a second base station of the second cell may be initiated. The connection may be initiated based on a forward handover, a radio link failure (RLF), and/or some other event such as, for example, as described with respect to FIG. 5 and/or FIG. 7. The user terminal may then receive second identity information from a second base station, such as base station 522 of FIG. 5 or base station 650 of FIG. 7, and begin the process of establishing a connection with the second base station. The second identity information may include, for example, PCI2 and C-RNTI2 and a second random number. At stage 840, a Radio Resource Control (RRC) connected state (RRC_Connected), as defined in, for example, the 3GPP Specifications, may be established with the second base station. This may be subsequent to receipt of an RRCConnectionReestablishment message at the user terminal.

At stage 850, RLF may be declared. This may be associated with the second base station at a time or process stage between establishment of the RRC_Connected state and completion of establishment of the connection or finalization of the handover to the second base station, such as prior to completion of an RRCConnectionReconfiguration process.

At stage 860, a connection with a third base station of a third cell may be initiated. The third base station may correspond, for example, to base station 532 of FIG. 5 and/or base station 670 of FIG. 7. The third base station connection may be performed using the first identity information, such as S-TMSI1, or PCI1 and/or C-RNTI1 and/or the first random number, rather than using the second identity information received from the second (or subsequently accessed) base stations.

The user terminal may be, for example, an LTE user equipment (UE). The first, second, and/or third base stations (and/or subsequent base stations in a multiple RLF situation) may be, for example, LTE eNBs. Alternately, the second base station may be a non-LTE base station, such as a GERAN or UTRAN base station, and the first and third (and/or subsequent) base stations may be LTE base stations. The first cell identity information may include a Physical Cell Identity (PCI). The first user terminal identity information may include an SAE Temporary Mobile Subscriber Identity (S-TMSI). The first user terminal identity information may include a C-RNTI and first random number.

The third base station may be a different base station from the first base station and the second base station. Alternately, the third base station and the first base station may be the same base station. Alternately, the third base station and the second base station may be the same base station.

The process 800 may further include, for example, establishing an RRC_Connected state with the third base station and declaring a second RLF associated with the third base station between establishment of the RRC_Connected state with the third base station and completion of establishment of the connection to the third base station. The process 800 may further include initiating a connection with a fourth base station of a fourth cell using the first identity information. The process 800 may be repeated one or more additional times with different cells and/or the same cells as were previously accessed or attempted to be accessed using the first identity information so as to complete a handover or other reconnection.

Process 800 may further include, for example, receiving, at the user terminal, a second identity associated with the second cell and disregarding the second identity during attempts to perform subsequent connections, such as during stage 860 or subsequent connection stages (not shown in FIG. 8). For example, the user terminal may receive second identity information, such as PCI2 and C-RNTI2 from the second base station but may disregard this information when attempting to establish connections with other base stations, such as in the case of multiple RLFs. Process 800 may further include storing new identity information associated with a second or subsequently accessed cell after handover is completed, such as subsequent to stage 860. Process 800 may further include removing the first identity information from the user terminal once handover is completed. The information may be removed subsequent to completion of the forward handover and associated connection to the third (or subsequent) base station.

Figure 9:
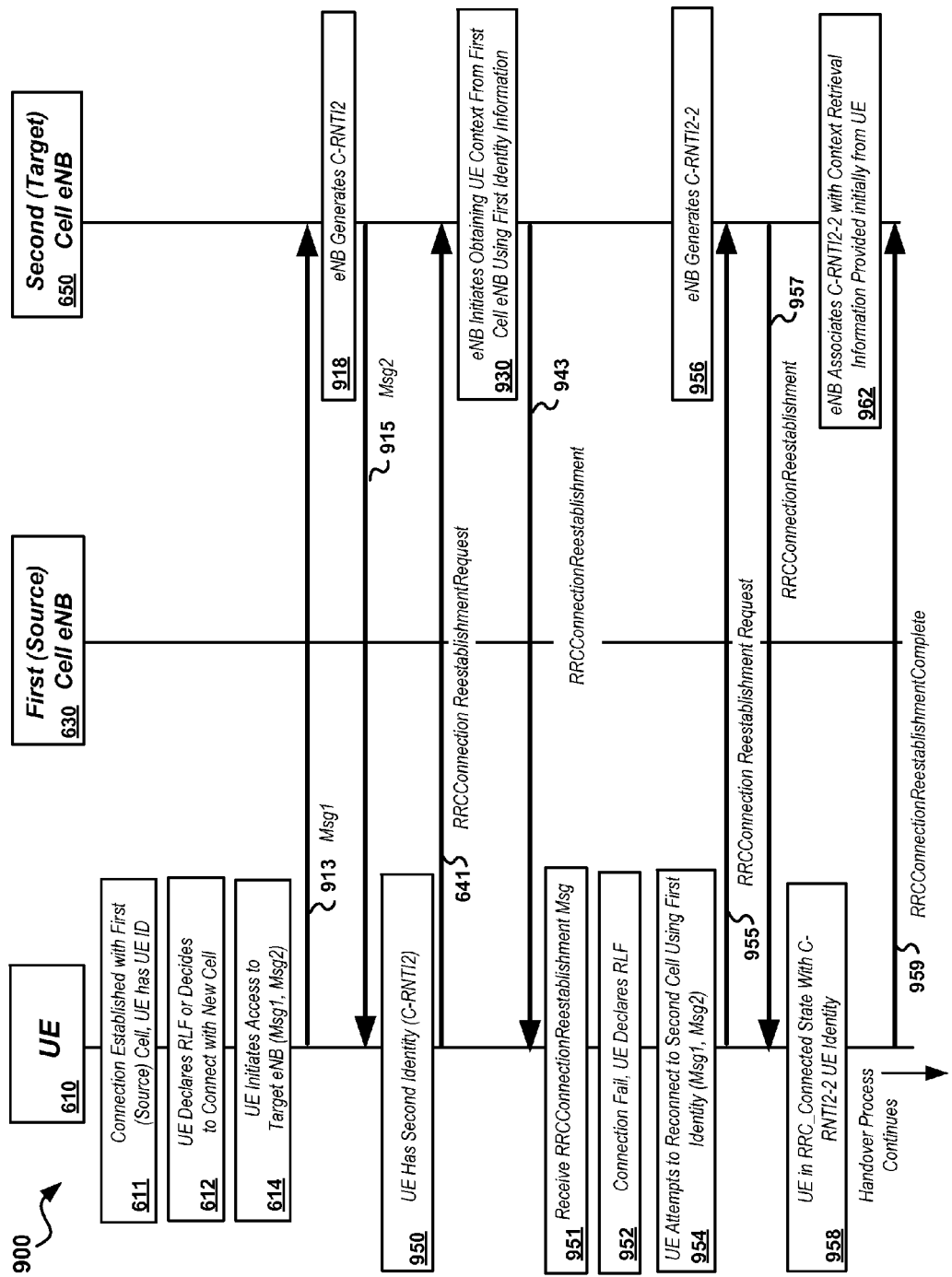
FIG. 9 illustrates details of a timing diagram for an embodiment of an alternate handover procedure to mitigate the effects of RLF during handover.

In another aspect, a handover procedure may be made more robust during connection failure subsequent to establishment of the RRC_Connected state at a second base station of a second cell as further described with respect to FIG. 9. FIG. 9 illustrates a timing diagram 900 associated with an alternative handover procedure which may mitigate the effects of an RLF during handover. In this scenario, RLF may occur between transmission of an RRCConnectionReestablishmentRequest message from a UE and completion of the connection with the target base station. For example, processing may proceed as described previously with respect to FIG. 6A to stage 614, wherein transmission of LTE Msg1 913 from UE 610 and receipt of LTE Msg2 915 from eNB 650 may be performed. For example, upon receipt of Msg1, at stage 918, eNB 650 may generate a second identity (e.g., C-RNTI2) and send it in Msg2 915 to UE 610. At stage 950, UE 610 has the second identity, and may send an RRCConnectionReestablishmentRequest message 641 (e.g., LTE Msg3) to eNB 650. eNB 650 may then generate and send an RRCConnectionReestablishment message 943 to UE 610 (e.g., LTE Msg 4). At stage 952, UE 610 may receive message 943.

However, an RLF may occur at UE 610 at stage 952 (i.e., after transmission of message 641 and receipt of message 943), and therefore UE 610 may not be able to complete the connection. UE 610 may then perform a cell reselection procedure and may attempt to reconnect to the second cell and associated eNB 650 at stage 954 (e.g., via a subsequent Msg1, Msg2., etc. signaling). Upon receipt of the subsequent Msg 1 (not shown), eNB 650 may generate, at stage 956, a third identity (e.g., C-RNTI2-2) for transmission to UE 610. Upon receipt of the subsequent Msg2 from eNB 650 (not shown), UE 610 will have the third identity. UE 610 may then send another RRCConnectionReestablishmentRequest 955 (e.g., Msg3), to which eNB 650 may then respond with RRCConnectionReestablishment message 957 (e.g., Msg4). At stage 958, UE 610 will then be in an RRC_Connected state with the third identity (C-RNT2-2), and may then send an RRCConnectionReestablishmentComplete message 959 to eNB 650.

As shown in FIG. 9, prior to declaration of RLF at stage 952, eNB 650 may retrieve UE context information at stage 930, which may be based on the first identity information provided by UE 610. At stage 962, eNB 650 may merge identities (e.g., C-RNT2 and C-RNT2-2) to associate the context information with the merged identity, and the merged identity may remain in the form of the value or data associated with C-RNT2-2. For example, at stage 962, eNB 650 may associate C-RNT2-2 with the context retrieved initially at stage 930 from the original context information provided by the UE (e.g., source identity information such as C-RNT1, PCI1, or S-TMSI1).

Figure 10:
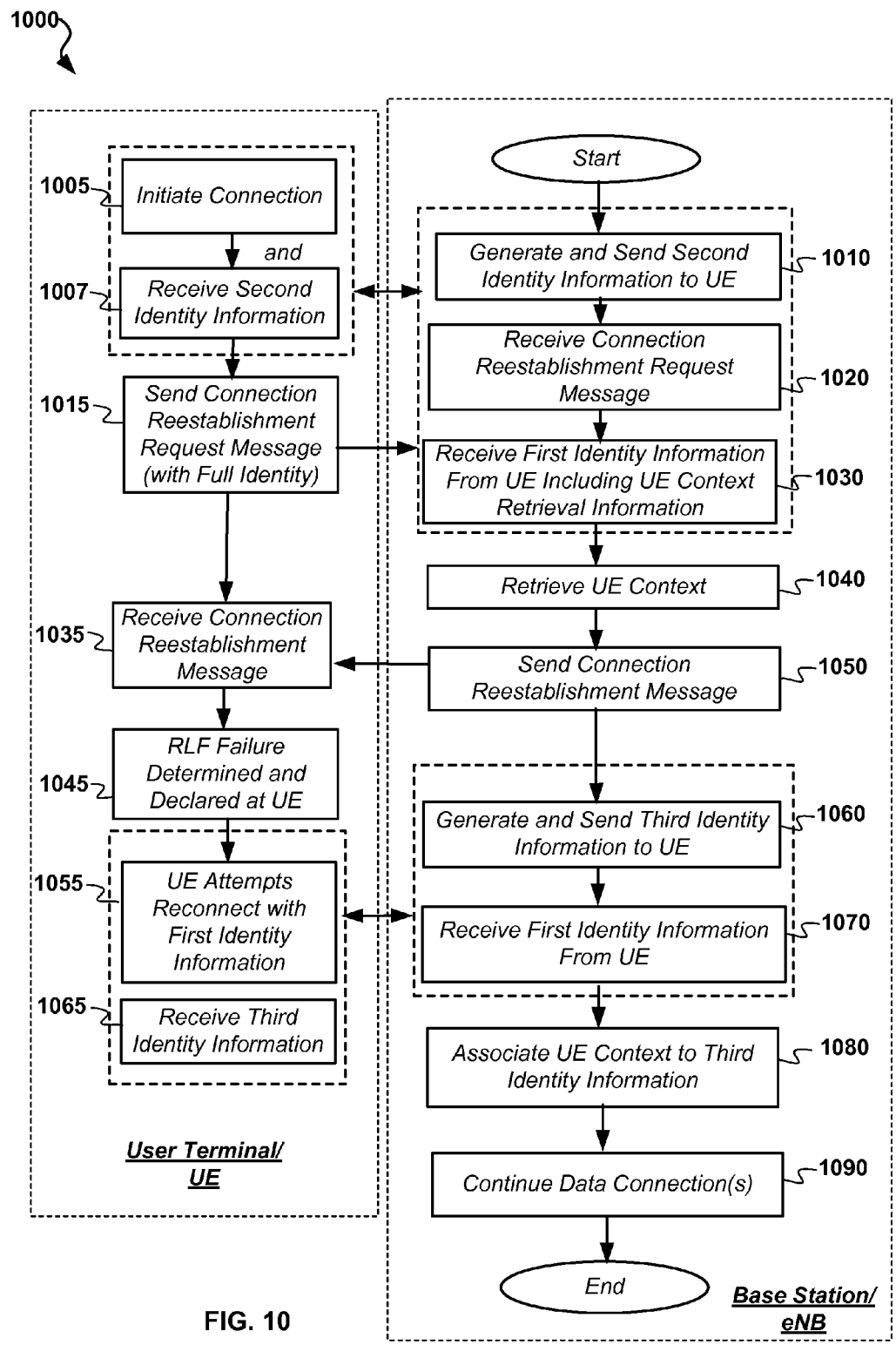
FIG. 10 illustrates details of an embodiment of a process for providing an alternate handover process at a base station.

FIG. 10 illustrates details of an embodiment of a process 1000 that may be used to facilitate a forward handover in a communications system at a target base station, such as eNB 650 as shown in FIG. 9. At stage 1005, a UE, such as UE 610 as shown in FIG. 9, may attempt to establish a connection with a target base station, such as target base station 650. The connection may be initiated by generating and sending a connection message, such as LTE Msg1. The target base station may generate and send second identity information 1010 to the UE, which may be received at stage 1007 at the UE, such as in LTE Msg2. The second identity information may be information generated at the target base station, such as a C-RNTI2 as described previously herein.

At stage 1015, the UE may send a connection reestablishment request message, which may include full UE identity information. At stage 1020, the target base station may receive the connection reestablishment message, and at stage 1030 the target base station may receive first identity information from the UE. The first identity information may include information for retrieval of user context information stored at a source or first base station. For example, the first identity information may be first identity information as described previously herein. Stage 1030 may be integral with the stage 1020 of receiving a connection reestablishment message.

The UE context may be retrieved at stage 1040 at the target or second cell from the source or first cell, based on the first identity information. The base station may send a connection reestablishment message at stage 1050, which may be received at the UE at stage 1035.

Prior to completion of the connection, the user terminal may declare an RLF at stage 1045, and subsequently attempt to reconnect to the base station at stage 1055. At stage 1060, the base station may generate and send third identity information to the user terminal. The third identity information may be, for example, another C-RNTI, such as C-RNTI2-2 as described previously herein. At stage 1065, the UE may receive and store the third identity information. The received third identity information may be used subsequently by the UE and base station to continue the connection, such as described below.

At stage 1070, the base station may receive the first identity information from the user terminal. Based on, for example, knowledge of the previous connection attempt by the user terminal, at stage 1080, the base station may associate the UE context information with the third identity information. At stage 1090, the data connection process may continue between the base station and user terminal. At stage 1090, the data connection process may continue between the base station and user terminal and the UE updates the stored base-station/UE identity with the newly allocated identities.

The first identity information may include, for example, a Physical Cell Identity (PCI) and a Cell Radio Network Temporary Identifier (C-RNTI) associated with the first base station. The first identity information may include an SAE Temporary Mobile Subscriber Identity (S-TMSI). The second identity information may include a C-RNTI (e.g., C-RNTI2) generated by the second base station. The third identity information may include a C-RNTI (e.g., C-RNTI2-2) generated by the second base station (assuming the user terminal returns to the second base station and attempt to reconnect). The method may further include sending an RRCConnectionReestablishment message, wherein the RLF occurs before receipt of the RRCConnectionReestablishment message.

Figure 11:
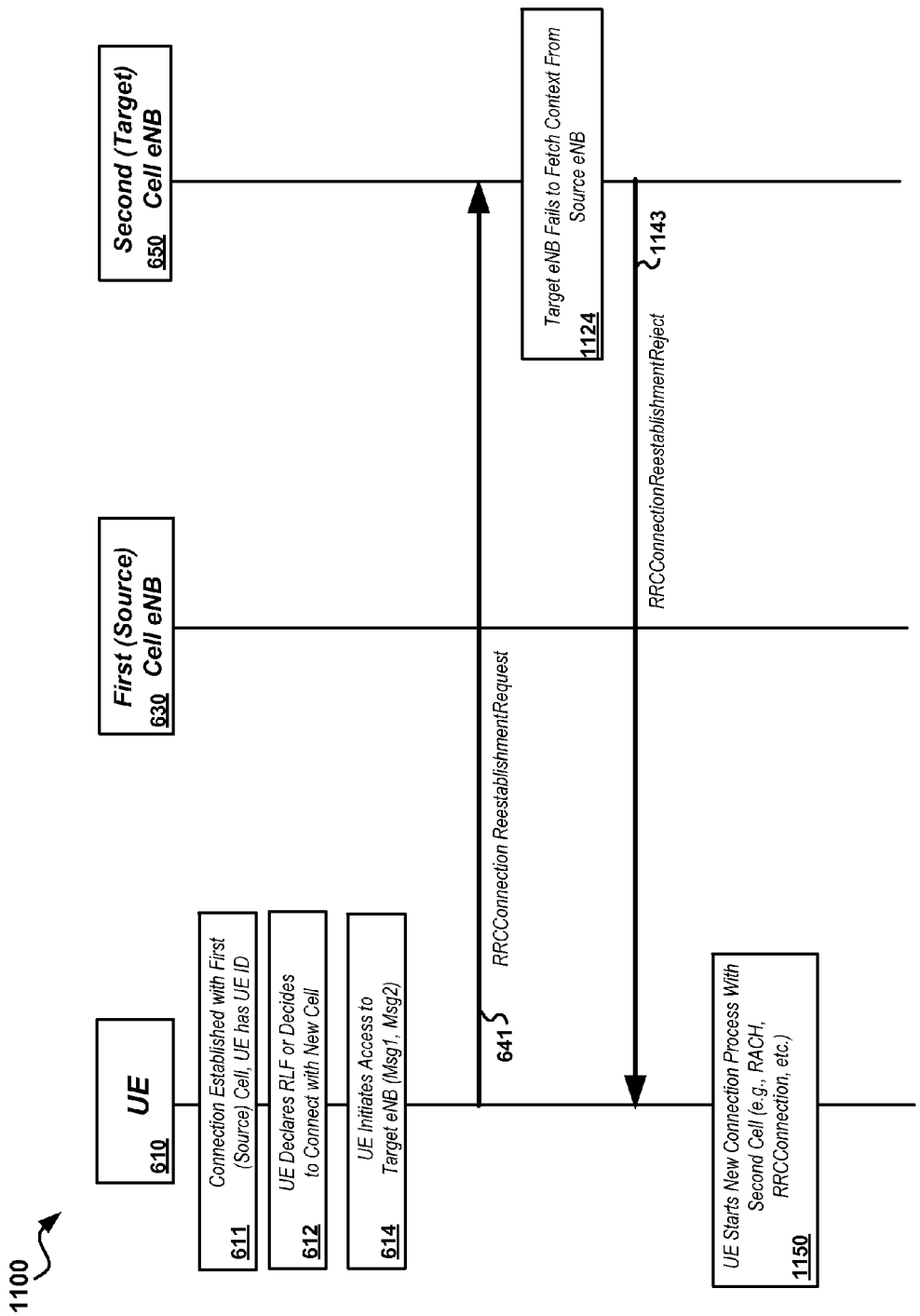
FIG. 11 illustrates a timing diagram for an unsuccessful forward handover procedure where a base station is unable to retrieve user terminal context.

As described previously, FIG. 6A illustrates an example successful handover procedure wherein UE context is transferred from a source cell to a target cell. FIG. 11 illustrates a timing diagram of a similar handover procedure 1100 where a target cell is unable to obtain the UE context information from a source cell. Specifically, the process may proceed as described with respect to FIG. 6A to transmission of RRCConnectionReestablishmentRequest message 641 from UE 610 to eNB 650. eNB 650 may, however, be unable to retrieve the UE context information from source base station eNB 630 at stage 1124. In this case, in accordance with the 3GPP Standards, including, for example, 3GPP TS 36.331, Section 5.3.7, upon failure to retrieve the UE context, eNB 650 may send an RRCConnectionReestablishmentReject message 1143 to the UE 610. This will necessitate performance of a new full connection process 1150 at the UE, including performing the full RACH procedure, which may cause connection delay and/or otherwise decrease forward handover performance.

Figure 12:
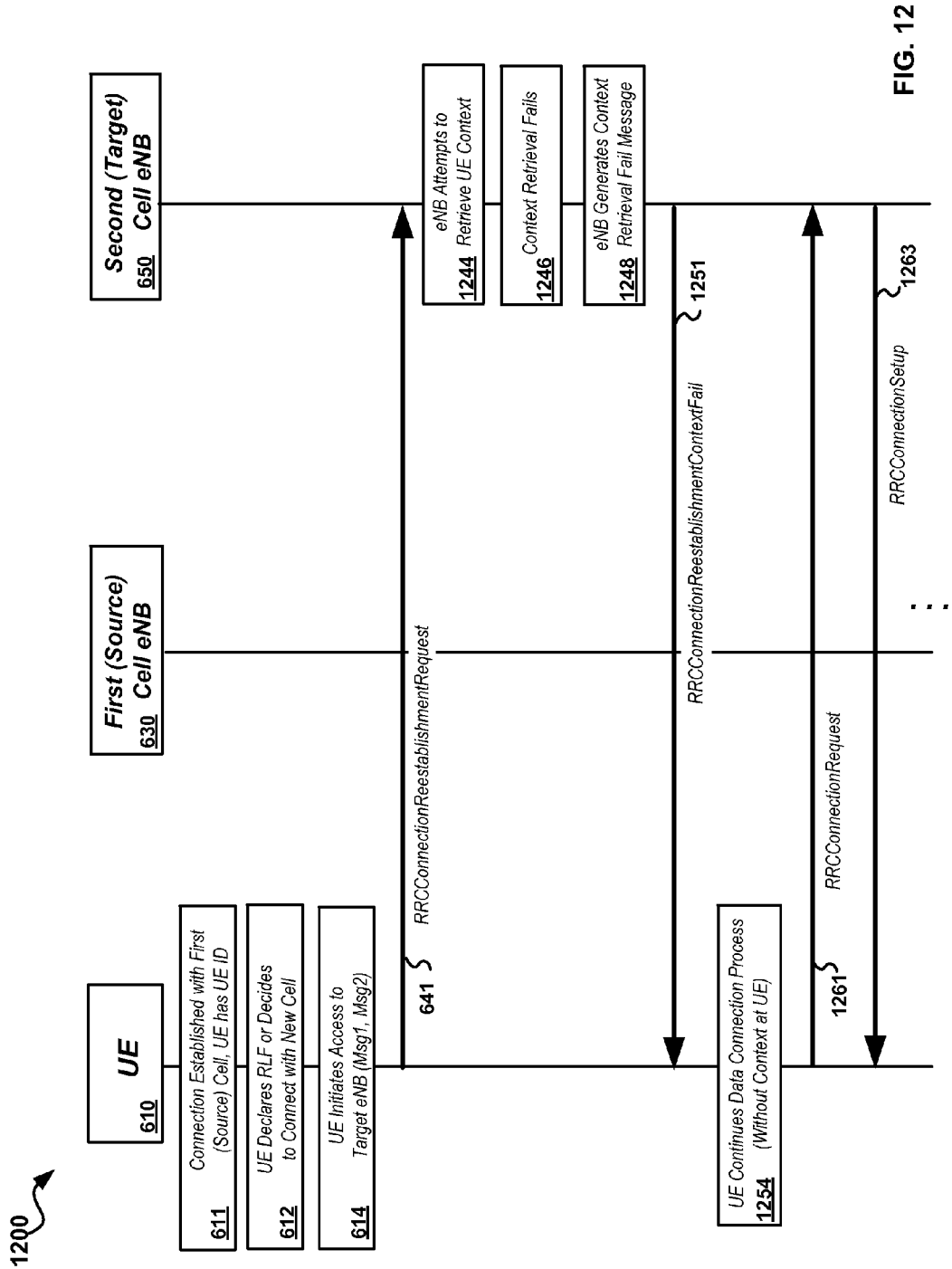
FIG. 12 illustrates details of a timing diagram for an embodiment of an alternate forward handover procedure to mitigate the effects of failure to retrieve user terminal context.

In accordance with some aspects, an alternate procedure, as illustrated in the embodiment, as shown in the timing diagram 1200 of FIG. 12, may be performed to improve handover performance in the event of context retrieval failure. As shown in FIG. 12, processing may proceed as shown previously in FIG. 6A to transmission of an RRCConnectionReestablishmentRequest message 641. At stage 1244, eNB 650 may attempt to retrieve the UE 610 context from eNB 630. At stage 1246, retrieval of the context may fail. At stage 1248, eNB 650 may then generate a Context Retrieval Fail message. This message may be provided to UE 610 instead of the RRCConnectionReestablishmentReject message, and may be configured so as to inform the UE to continue the connection process without initiating a new connection. For example, eNB 650 may send an RRCConnectionReestablishmentContextFail message 1251, which may be received by UE 610. Upon receipt, the UE may then continue with the connection establishment process at stage 1254, such as by sending an RRCConnectionRequest message 1261 (but not perform a RACH procedure). eNB 650 may then send an RRCConnectionSetup message 1263 to continue the connection process.

Figure 13:
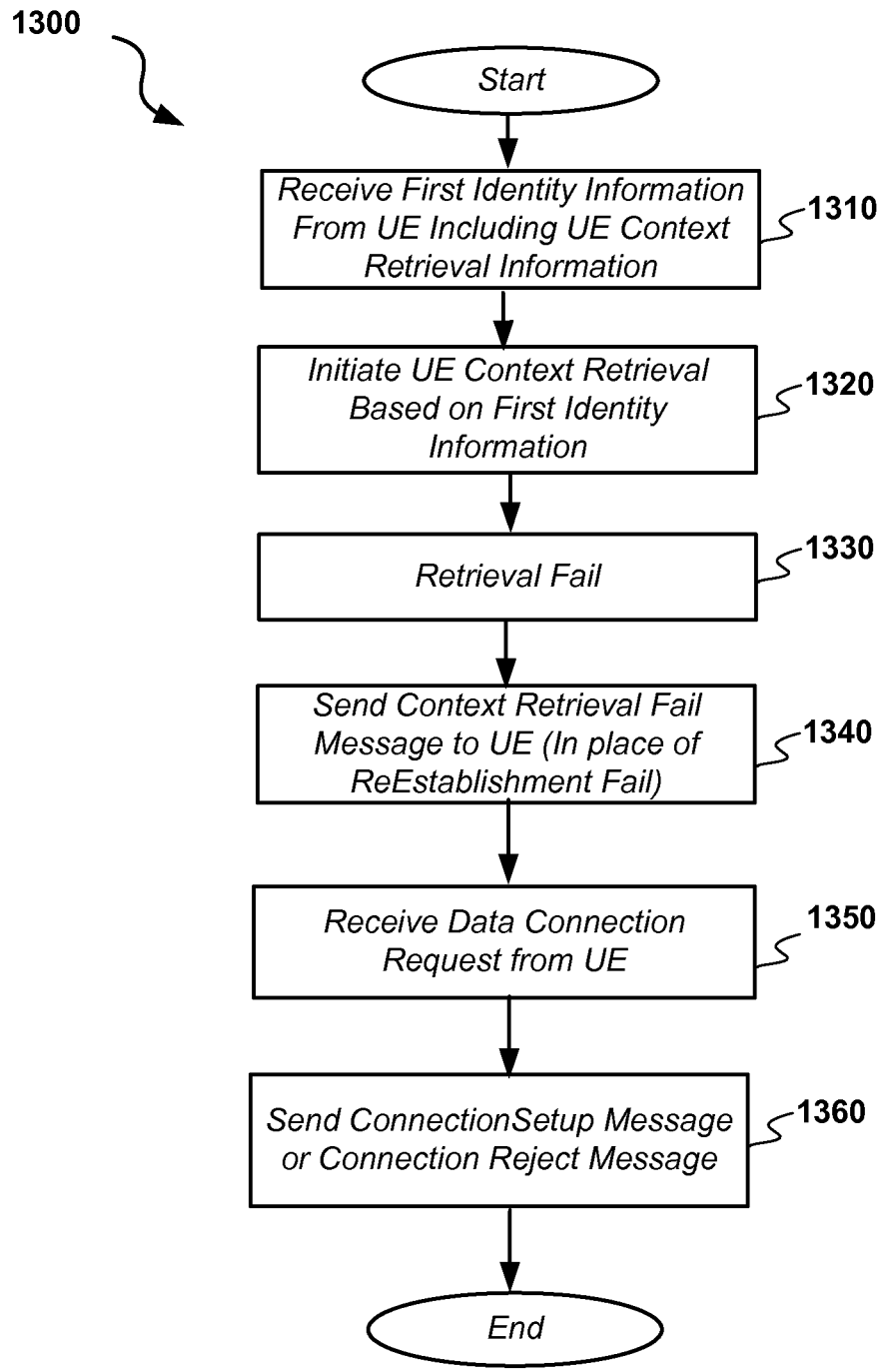
FIG. 13 illustrates details of an embodiment of a process for providing an alternate forward handover process at a base station to mitigate the effects of failure to retrieve user terminal context.

FIG. 13 illustrates details of an embodiment of a process 1300 that may be performed at a base station, such as eNB 650 as shown in FIG. 12. At stage 1310, first identity information sent from a user terminal, such as UE 610 as shown in FIG. 12, may be received at the base station. The first identity information may include information for retrieval of user context information stored at a first or source base station, such as eNB 630 of FIG. 12. At stage 1320, retrieval of the user terminal context information may be initiated by a target base station. At stage 1330, context retrieval may fail. In response to failure to retrieve the user terminal context, the base station may generate and send a context retrieval fail message at stage 1340. The context retrieval fail message may include information informing the user terminal that context retrieval has failed, but connection processing can continue.

At stage 1350, a subsequent message may be received at the base station from the user terminal. This may be a connection request message. A connection setup message or a connection reject/release message may be sent at stage 1360, in response to the connection request. The connection setup message may be an RRCConnectionSetup message. The connection request message may be an RRCConnectionRequest message, and the connection request message may be received without receipt of preceding Random Access Channel (RACH) procedure signaling provided from the user terminal.

Figure 14:
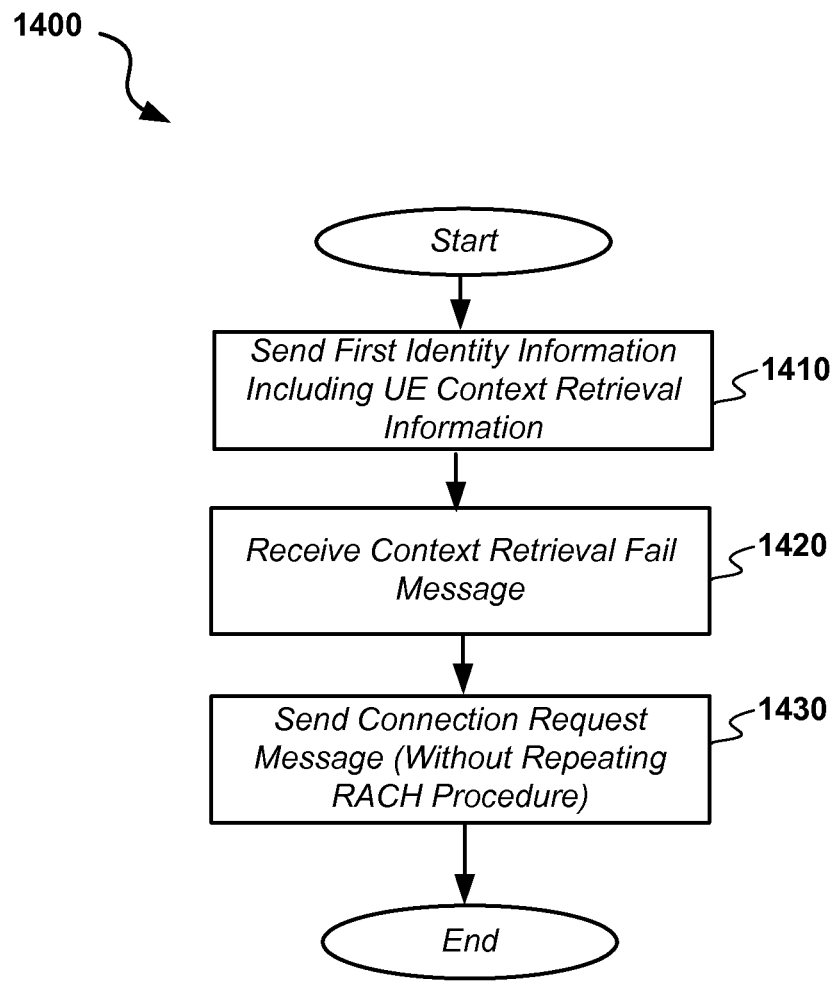
FIG. 14 illustrates details of an embodiment of a process for providing an alternate forward handover process at user terminal to mitigate the effects of failure to retrieve user terminal context.

FIG. 14 illustrates details of an embodiment of a process 1400 that may be performed at a user terminal, such as UE 610 as shown in FIG. 12. At stage 1410, first identity information may be sent from the user terminal to a target base station, such as base station 650 of FIG. 12. The first identity information may include information for retrieval of user context information stored at a source base station, such as eNB 630 of FIG. 12. At stage 1420, a context retrieval fail message may be received from the source base station. This message may be generated by the source base station in response to failure to retrieve user terminal context from the source base station. The process may further include sending a connection request message 1430 to the target base station, without performing a RACH procedure with the target base station. The connection request message may be sent subsequent to receipt of the context retrieval fail message.

The connection request message may be, for example, an RRCConnectionRequest message sent from the user terminal. Process 1400 may further include receiving, from the target base station, a connection setup message, and sending a connection setup complete message. The setup complete message may be an RRCConnectionSetupComplete message.

Figure 15:
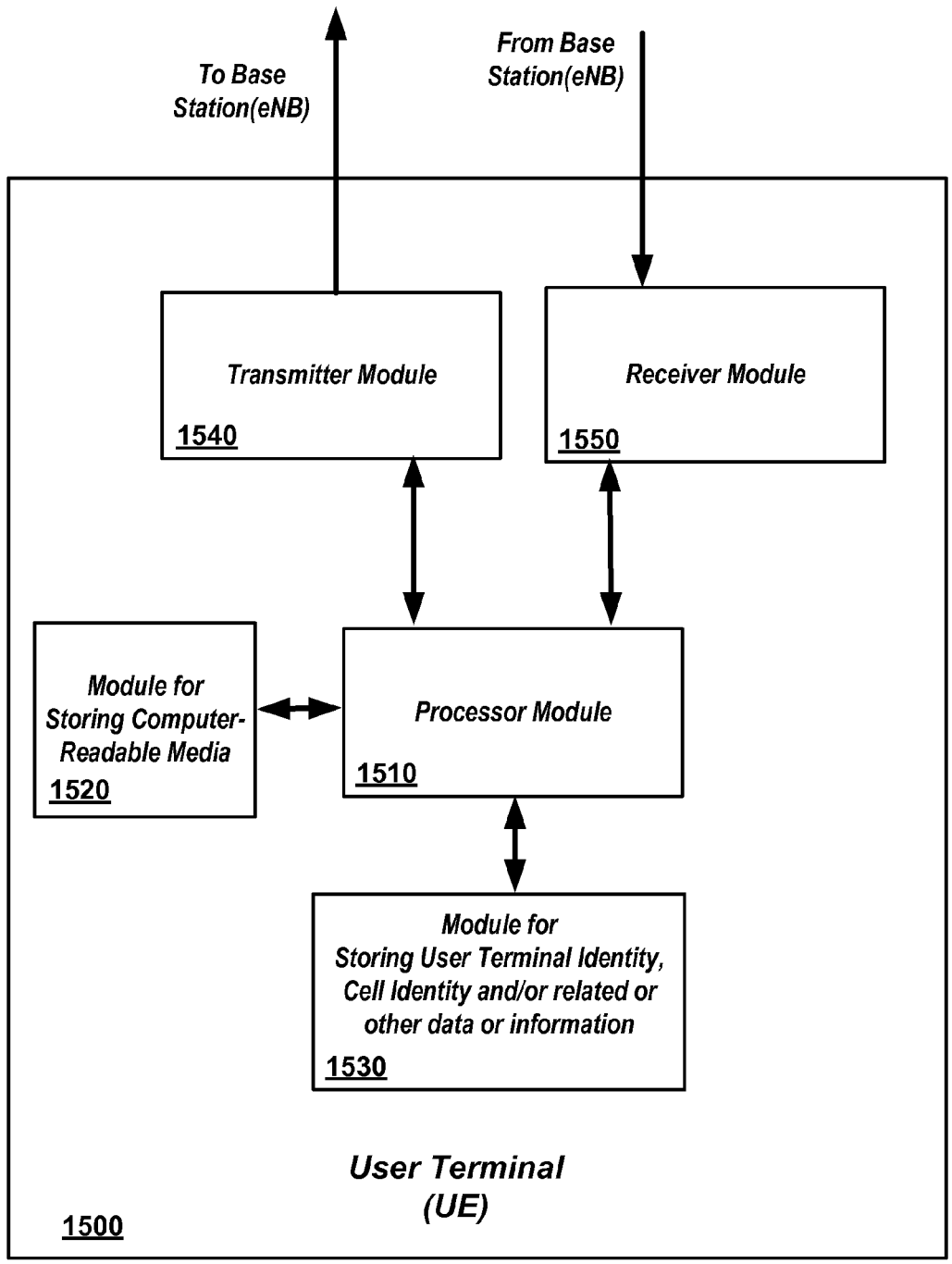
FIG. 15 illustrates details of an embodiment of a user terminal for use in a communication system.

FIG. 15 illustrates details of an embodiment of a user terminal 1500, which may correspond to user terminals described previously herein, such as UE 350 and/or UE 610. Terminal 1500 may include one or more processor modules 1510, which may include one or more processors as well as associated components, such as I/O modules, buses, memories, programmable devices, and the like. Processor module 1510 may be configured to implement the user terminal/UE processing functions as described herein, and in particular processing functions associated with FIGS. 7, 8, 9, 10, and 14. One or more modules 1520 including computer readable media may be coupled to processor modules 1510, and may include processor executable instructions stored on the computer-readable media to perform the various functions described herein. One or more memory modules 1530, such as memories configured to store information such as user terminal identity, cell identity, and/or other data or information as described herein may be coupled to processor module 1510 to facilitate performing the functions described herein.

Terminal 1500 may also include one or more transmitter modules 1540 configured to communicate with other wireless network nodes. These other nodes may be, for example, base stations such as eNBs 630, 650, and 670. Transmitter module 1540 may be coupled to processor module 1510 and/or to memory or other modules (not shown) to facilitate performance of the transmit-related processing functions described herein. Similarly, terminal 1500 may include one or more receiver modules 1550, which may similarly be coupled to processor module 1510 and/or to memory or other modules (not shown) to facilitate performance of the receive-related processing functions described herein, and in particular with regard to base stations such as eNBs 630, 650, and 670.

Figure 16:
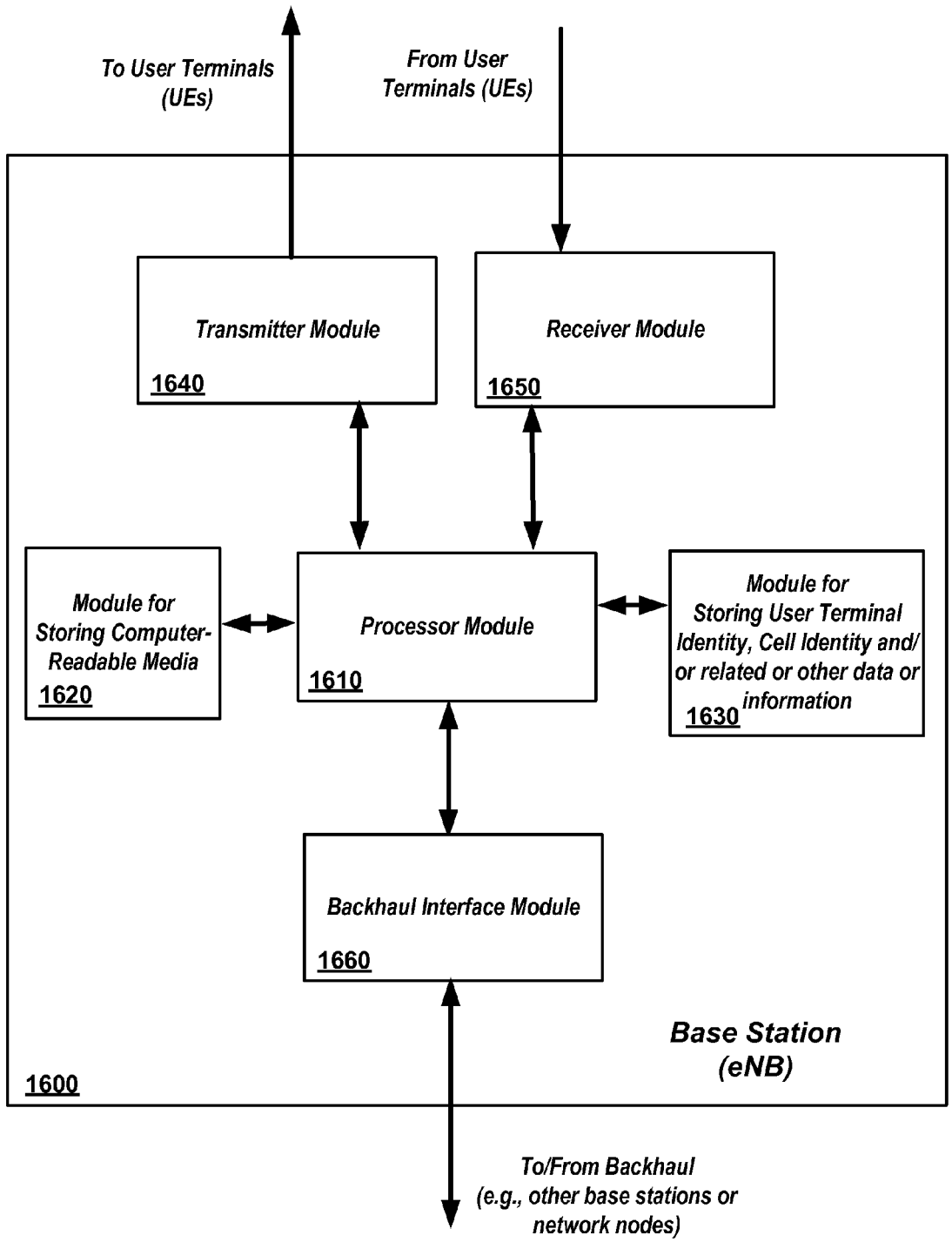
FIG. 16 illustrates details of an embodiment of a base station for use in a communication system.

FIG. 16 illustrates details of an embodiment of a base station 1600, which may correspond to base stations described previously herein, such as eNB 310, or eNBs 630, 650, or 670. Base station 1600 may include one or more processor modules 1610, which may include one or more processors as well as associated components, such as I/O modules, buses, memories, and the like. Processor module 1610 may be configured to implement the base station/eNB processing functions as described herein, and in particular processing functions associated with FIGS. 7, 9, 10, 12, and 13. One or more modules 1620 including computer readable media 1620 may be coupled to processor modules 1510, and may include processor executable instructions stored on the computer-readable media to perform the various functions described herein. One or more memory modules 1630, such as memories configured to store information such as user terminal identity, cell identity, user terminal context, and/or other data or information as described herein may be coupled to processor module 1610 to facilitate performing the functions described herein.

Base station 1600 may also include one or more transmitter modules 1640 configured to communicate with other wireless network nodes. These other nodes may be, for example, user terminals, such as UEs 310 and 610. These may also be other base stations such as eNBs 630, 650, and 670. Transmitter module 1640 may be coupled to processor module 1610 and/or to memory or other modules (not shown) to facilitate performance of the transmit-related processing functions described herein. Similarly, base station 1600 may include one or more receiver modules 1650, which may similarly be coupled to processor module 1610 and/or to memory or other modules (not shown) to facilitate performance of the receive-related processing functions described herein, and in particular with regard to user terminals such as UEs 310 and 610, as well as base stations such as eNBs 630, 650, and 670. Base station 1610 may also include one or more Backhaul interface modules 1660. Module 1660 may be configured to communicate using backhaul connections, such as illustrated with respect to FIGS. 3, 4A, and 4B. The interface may be via wired connections, such as S1 connections, and/or may include wireless connectivity, such as X2 connections. In particular, base station 1600 may be a target base station and interface module 1660 may be configured to retrieve UE context information from other base stations, such as a source base station such as base station 630 as described previously herein.

In some configurations, the apparatus for wireless communication includes means for performing various functions as described herein. In one aspect, the aforementioned means may be a processor or processors and associated memory in which embodiments reside, such as are shown in FIGS. 3, 7, 15, and 16 and which are configured to perform the functions recited by the aforementioned means. The aforementioned means may be, for example, modules or apparatus residing in UEs, eNBs, and/or other network nodes, such as are shown in FIGS. 1-5, 7, 15, and 16 to perform the connection and handover functions and other functions as are described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

We claim:

1. A method for facilitating a forward handover in a communications system, comprising:

establishing, by a user terminal, a connection with a first base station of a first cell, the connection including a Radio Resource Control Connected (RRC_Connected) state and a data connected state;

storing at the user terminal first identity information associated with the connection to the first cell, the identity information comprising a Physical Cell Identity (PCI) and a Cell Radio Network Temporary Identifier (C-RNTI);

selecting, by the user terminal, a second base station of a second cell based on a first criterion determined by the user terminal;

initiating, at the user terminal, a forward handover to the second base station of the second cell;

receiving, at the user terminal, second identity information associated with the second cell;

re-establishing the RRC_Connected state with the second base station;

declaring, by the user terminal, a Radio Link Failure (RLF) between re-establishment of the RRC_Connected state and completion of establishment of the connection to the second base station, based on a second criterion determined by the user terminal; and initiating, by the user terminal, reestablishment of the connection with a third base station of a third cell using the first identity information.

2. The method of claim 1, wherein the declaring RLF occurs before completion of an RRCConnectionReconfiguration procedure.

3. The method of claim 1, wherein the third base station is a different base station from the first base station and the second base station.

4. The method of claim 1, wherein the third base station and the first base station are the same base station.

5. The method of claim 1, further comprising:
receiving, at the user terminal, third identity information associated with the third cell;
declaring, by the user terminal, a second RLF associated with the third base station between establishment of the RRC_Connected state with the third base station and completion of establishment of the connection to the third base station; and
reestablishing the connection with a fourth base station of a fourth cell using the first identity information.

6. The method of claim 5, further comprising:
disregarding the third identity information received during the re-establishment of the RRC_Connected state with the third base station.

7. A computer program product comprising a non-transitory computer-readable medium including codes executable by a processor of a user terminal to:
establish a connection with a first base station of a first cell, the connection including a Radio Resource Control Connected (RRC_Connected) state and a data connected state;
store first identity information associated with the connection to the first cell, the identity information comprising a Physical Cell Identity (PCI) and a Cell Radio Network Temporary Identifier (C_RNTI);
select a second base station of a second cell based on a first criterion determined by the user terminal;
initiate a forward handover to the second base station of the second cell;
receive second identity information associated with the second cell;
re-establish the RRC_Connected state with the second base station;

declare a Radio Link Failure (RLF) between re-establishment of the RRC_Connected state and completion of establishment of the connection to the second base station, based on a second criterion determined by the user terminal; and
initiate reestablishment of the connection with a third base station of a third cell using the first identity information.

8. A user terminal, comprising:
a processor module configured to establish, in conjunction with a receiver module and a transmitter module, a connection with a first base station of a first cell, the connection including a Radio Resource Control Connected (RRC_Connected) state and a data connected state;
a module configured to store first identity information associated with the connection to the first cell, the identity information comprising a Physical Cell Identity (PCI) and a Cell Radio Network Temporary Identifier (C_RNTI);
wherein the processor module is further configured to select a second base station of a second cell based on a first criterion and
the transmitter module, in conjunction with the processor module, is further configured to initiate a forward handover with the second base station of the second cell;
wherein the processor module is further configured to declare, in conjunction with the receiver module, a Radio Link Failure (RLF) between establishment of the RRC_Connected state and completion of establishment of the connection to the second base station, based on a second criterion; and
wherein the transmitter module is further configured to initiate reestablishment of the connection with a third base station of a third cell using the first identity information and first user terminal information subsequent to the declaration of RLF.

9. The communications device of claim 8, wherein the declaring RLF occurs before completion of an RRCConnectionReconfiguration procedure.

10. A user terminal, comprising:
means for establishing a connection with a first base station of a first cell, the connection including a Radio Resource Control Connected (RRC_Connected) state and a data connected state;
means for storing first identity information associated with the connection to the first cell, the identity information comprising a Physical Cell Identity (PCI) and a Cell Radio Network Temporary Identifier (C_RNTI);
means for selecting a second base station of a second cell based on a first criterion determined by the user terminal;
means for initiating a forward handover between the user terminal and the second base station of the second cell;
means for receiving second identity information associated with the second cell;
means for re-establishing the RRC_Connected state with the second base station;
means for declaring a Radio Link Failure (RLF) between re-establishment of the RRC_Connected state and completion of establishment of the connection to the second base station, based on a second criterion determined by the user terminal; and
means for initiating reestablishment of the connection with a third base station of a third cell using the first identity information.

11. A method for facilitating a forward handover in a communications system, comprising:
- establishing, at a user terminal, a connection with a source base station of a source cell, the connection including a Radio Resource Control Connected (RRC_Connected) state and a data connected state;
- storing at the user terminal, first identity information associated with the connection with the source cell, the first identity information comprising a Physical Cell Identity (PCI) and a Cell Radio Network Temporary Identifier (C-RNTI);
- selecting, by the user terminal, a target base station of a target cell based on a first criterion determined by the user terminal;
- sending, from the user terminal to the target base station, a connection reestablishment request including the first identity information for retrieval of user context information stored at the source base station;
- receiving, at the user terminal, a message from the target base station informing the user terminal to continue the connection process without performing a Random Access Channel (RACH) procedure; and
- sending, from the user terminal, a connection request message to the target base station, without performing a RACH procedure with the target base station, subsequent to receipt of the message.

12. The method of claim 11, wherein the connection request message is an RRCConnectionRequest message.

13. The method of claim 11, further comprising receiving, from the target base station, a connection setup message.

14. A computer program product comprising a non-transitory computer-readable medium including codes executable by a processor of a user terminal to:
- establish a connection with a source base station of a source cell, the connection including a Radio Resource Control Connected (RRC_Connected) state and a data connected state;
- store first identity information associated with the connection with the source cell, the first identity information comprising a Physical Cell Identity (PCI) and a Cell Radio Network Temporary Identifier (C-RNTI);
- select a target base station of a target cell based on a first criterion determined by the user terminal;
- send to the target base station, a connection reestablishment request including first identity information for retrieval of user context information stored at a source base station;
- receive, from the target base station, a message informing the user terminal to continue the connection process without performing a Random Access Channel (RACH) procedure; and
- send a connection request message to the target base station, without performing a RACH procedure with the target base station, subsequent to receipt of the message.

15. A user terminal, comprising:
- a processor module configured to
- establish a connection with a source base station of a source cell, the connection including a Radio Resource Control Connected (RRC_Connected) state and a data connected state,
- store first identity information associated with the source cell, the first identity information comprising a Physical Cell Identity (PCI) and a Cell Radio Network Temporary Identifier (C-RNTI), and
- select a target base station of a target cell based on a first criterion determined by the user terminal;
- a transmitter module configured to send to the target base station, a connection reestablishment request including the first identity information for retrieval of user context information stored at the source base station; and
- a receiver module configured to receive, from the target base station, a message informing the user terminal to continue the connection process without performing a Random Access Channel (RACH) procedure; wherein the transmitter module is further configured to send a connection request message to the target base station without performing a RACH procedure with the target base station subsequent to receipt of the message.

16. A user terminal, comprising:
- means for establishing a connection with a source base station of a source cell, the connection including a Radio Resource Control Connected (RRC_Connected) state and a data connected state;
- means for storing first identity information associated with the source cell, the first identity information comprising a Physical Cell Identity (PCI) and a Cell Radio Network Temporary Identifier (C-RNTI);
- means for selecting a target base station of a target cell based on a first criterion determined by the user terminal;
- means for sending to the target base station, a connection reestablishment request including first identity information for retrieval of user context information stored at a source base station;
- means for receiving, from the target base station, a message informing the user terminal to continue the connection without performing a Random Access Channel (RACH) procedure; and
- means for sending a connection request message to the target base station, without performing a RACH procedure with the target base station, subsequent to receipt of the message.

* * * * *